US009906761B2

United States Patent
Mori

(10) Patent No.: US 9,906,761 B2
(45) Date of Patent: Feb. 27, 2018

(54) PROJECTOR, ITS CONTROL METHOD, AND IMAGE PROJECTION SYSTEM

(71) Applicant: CANON KABUSHIKI KAISHA, Tokyo (JP)

(72) Inventor: Makiko Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 14/047,379

(22) Filed: Oct. 7, 2013

(65) Prior Publication Data
US 2014/0104582 A1 Apr. 17, 2014

(30) Foreign Application Priority Data

Oct. 11, 2012 (JP) .................................. 2012-225969

(51) Int. Cl.
*H04N 9/31* (2006.01)
(52) U.S. Cl.
CPC ......... *H04N 9/3185* (2013.01); *H04N 9/3147* (2013.01); *H04N 9/3182* (2013.01)
(58) Field of Classification Search
CPC ............... H04N 9/3185; H04N 9/3147; H04N 1/32208; G06T 5/006; G06T 3/4038; G03B 37/04
USPC .......... 353/30, 31, 69, 70, 94; 348/745, 746, 348/747
See application file for complete search history.

(56) References Cited

U.S. PATENT DOCUMENTS

| 2002/0041364 A1* | 4/2002 | Ioka ................................. 353/69 |
| 2006/0181685 A1* | 8/2006 | Hasegawa ........................ 353/69 |
| 2009/0315887 A1* | 12/2009 | Yamaguchi .......... G02B 27/017 345/428 |
| 2012/0007845 A1* | 1/2012 | Tsuida .................. H04N 9/3129 345/207 |
| 2012/0050698 A1* | 3/2012 | Kotani ............................ 353/94 |
| 2012/0120372 A1* | 5/2012 | Timoner ................. G06T 5/006 353/31 |

FOREIGN PATENT DOCUMENTS

| JP | 2005039784 A | 2/2005 |
| JP | 2005-123669 A | 5/2005 |
| JP | 2009-200557 A | 9/2009 |

(Continued)

*Primary Examiner* — Christina Riddle
*Assistant Examiner* — Christopher Lamb, II
(74) *Attorney, Agent, or Firm* — Cowan, Liebowitz & Latman, P.C.

(57) ABSTRACT

In a projector which constitutes an image projection system to project one image by combining a plurality of projection images projected by a plurality of projectors on a screen while overlapping parts of the projection images with each other, the projector is provided with a deformation unit configured to carry out geometric deformation with respect to an image to be projected therefrom, and a setting unit configured to set a parameter for deformation processing by the deformation unit, wherein the setting unit sets the parameter for deformation processing based on a relation between a position of an overlap area in the projection image before the deformation by the deformation unit is carried out, and a position of an overlap area in the projection image after the deformation by the deformation unit has been carried out.

22 Claims, 19 Drawing Sheets

(56) References Cited

FOREIGN PATENT DOCUMENTS

| | | |
|---|---|---|
| JP | 2009-200613 A | 9/2009 |
| JP | 2009-2000613 A | 9/2009 |
| JP | 2011107563 A | 6/2011 |
| JP | 2012-047849 A | 3/2012 |
| JP | 2012129594 A | 7/2012 |
| JP | 2014-503838 A | 2/2014 |
| WO | 2012-068112 A1 | 5/2012 |

\* cited by examiner

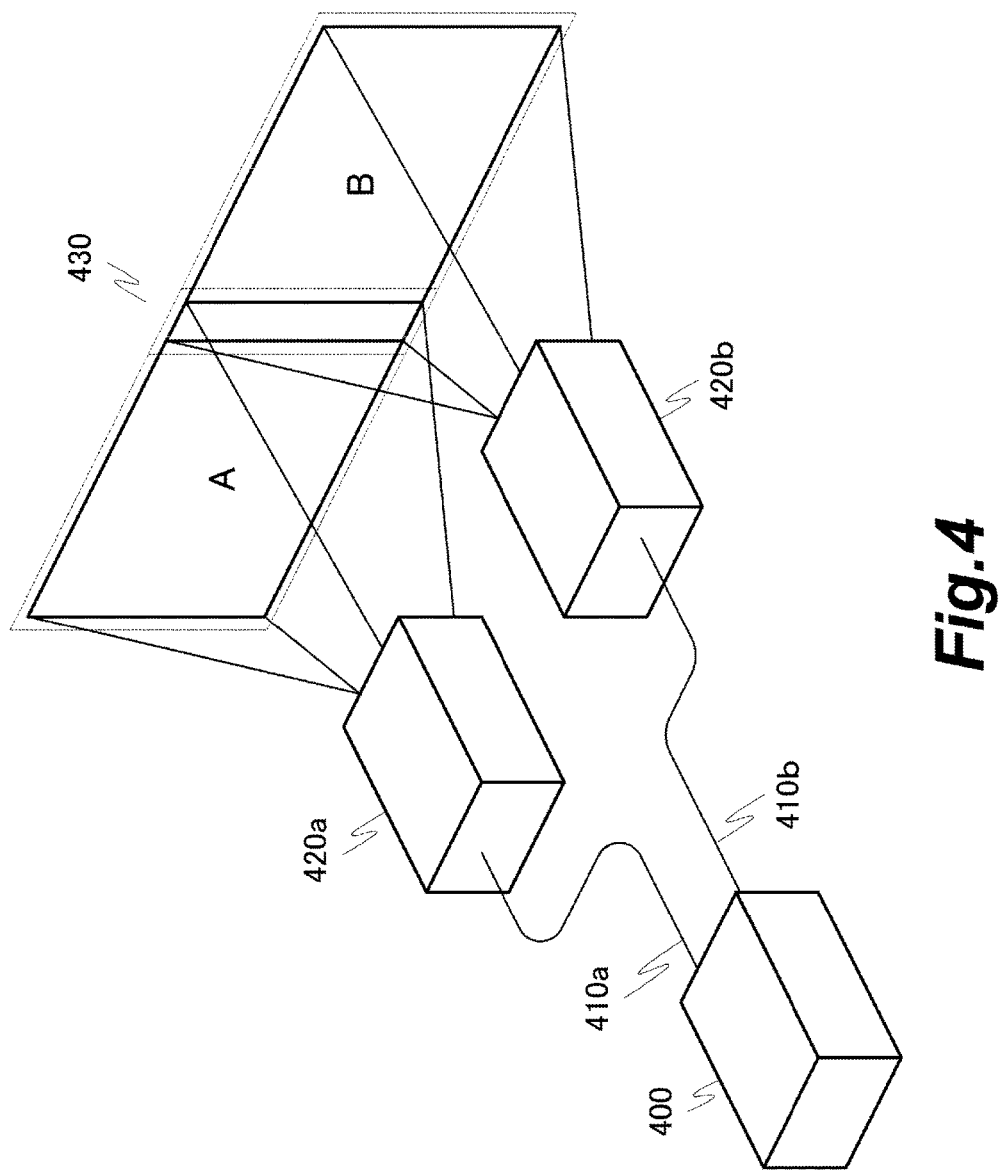

PROJECTOR, ITS CONTROL METHOD, AND IMAGE PROJECTION SYSTEM

BACKGROUND OF THE INVENTION

Field of the Invention

The present invention relates to a projector, its control method, and an image projection system.

Description of the Related Art

In the past, as a projector (projection device) there has been known a projector which projects and displays images generated by a light valve such as a liquid crystal panel onto a screen. In addition, in recent years, enhancement of the resolution of images is progressing, and it is desired to display images of a large number of pixels such as, for example, 4K2K, 8K4K, or the like on a big screen. In general, in order to increase the number of pixels and the size of a projector, it is necessary to make finer the light valve such as the liquid crystal panel, etc., or to adopt a high-intensity light source, so that the costs will go up. For that reason, projection display with a large number of pixels and a big screen can often be carried out by means of multiple projections using a plurality of projectors each of which has an ordinary light valve and an ordinary light source, and hence is inexpensive.

The multiple projection is a projection method in which projection (projected) images produced by a plurality of projection devices are joined or combined with one another on a plane of projection (screen) so that one image as a whole is displayed. At the time of combining the plurality of projection images, their joints will be visually seen or discerned if their positions are not adjusted in a precise manner, thus giving rise to degradation in quality of the projected images. Therefore, processing to make the joints inconspicuous or unnoticeable, which is called edge blend, is used. In the edge blend processing, a plurality of projected images are combined with one another by being made to partially overlap with one another. Then, steps or differences in luminance between overlap areas and non-overlap areas of the projected images are made inconspicuous by carrying out light dimming or reduction processing with respect to the overlap areas.

On the other hand, a projector may not be able to be arranged in front of a screen due to the restriction of its setting place or location. In this case, a geometric distortion called a trapezoidal distortion may be caused to the projected images on the screen due to a relative tilt of a main body of the projector with respect to the screen.

Accordingly, there is a projector which has a trapezoidal correction function to correct such a trapezoidal distortion by means of image processing. For example, in Japanese patent application laid-open No. 2005-123669, there is described in detail a calculation method for trapezoidal correction (keystone correction) based on a relative tilt angle between one projector main body and a screen.

In carrying out multiple projections, it is necessary to make the trapezoidal correction and the accurate alignment of the overlap areas compatible with each other, and hence, the operations of the installation or arrangement of the projector main body and the setting for the trapezoidal correction become complicated. In the case of a projector which does not have a lens shift function, it is necessary to move the projector main body for the alignment of the overlap areas, but the relative position of the projector with respect to the screen is changed due to such a movement, thus making it necessary to set the trapezoidal correction again. For that reason, it is necessary to carry out the adjustment or alignment of the projector main body and the trapezoidal correction in a repeated manner.

In addition, in Japanese patent application laid-open No. 2009-200613, there is proposed a method in which trapezoidal correction is carried out by aligning four corners of a projected image of each projector to the ends or corners of a rectangular screen at the time of multiple projection, and the adjustment or alignment of overlap areas of projected images is carried out by overlapping guides displayed in the overlap areas of individual projectors with one another.

SUMMARY OF THE INVENTION

However, in general, the projection areas of the individual projectors are by far larger than their overlap areas, and so, even if the positions of the four corners of each projection area are adjusted, it is usually rare for the overlap areas to match or coincide strictly with each other. In that case, it is necessary to strictly adjust the four corners of each projector through fine adjustments, and hence, there is a problem that the procedure thereof becomes complicated, for example.

Accordingly, the present invention is intended to make it possible to simplify user's operation in a multiple projection by using a plurality of projection devices.

A first aspect of the present invention resides in a projector which constitutes an image projection system to project one image by combining a plurality of projection images projected by a plurality of projectors on a screen while overlapping parts of the projection images with each other, said projector comprising:

a deformation unit configured to carry out geometric deformation with respect to an image to be projected therefrom; and a setting unit configured to set a parameter for deformation processing by said deformation unit;

wherein said setting unit sets said parameter for deformation processing based on a relation between a position of an overlap area in the projection image before the deformation by said deformation unit is carried out, and a position of an overlap area in the projection image after the deformation by said deformation unit has been carried out.

A second aspect of the present invention resides in a control method for a projector which constitutes an image projection system to project one image by combining a plurality of projection images projected by a plurality of projectors on a screen while overlapping parts of the projection images with each other, said method comprising:

carrying out geometric deformation processing with respect to an image to be projected; and setting a parameter for said deformation processing;

wherein in said setting, said parameter for deformation processing is set based on a relation between a position of an overlap area in the projection image before the deformation processing is carried out, and a position of an overlap area in the projection image after the deformation processing has been carried out.

A third aspect of the present invention resides in an image projection system which projects one image by combining a plurality of projection images projected by a plurality of projectors on a screen while overlapping parts of the projection images with each other, wherein said plurality of projectors include a reference projector which becomes a reference, and a secondary projector of which a position of a projection image to be projected therefrom is adjusted according to said reference projector;

wherein said reference projector comprises:

a first deformation unit configured to carry out geometric deformation with respect to a first image to be projected therefrom; and a first setting unit configured to set a first parameter for deformation processing by said first deformation unit;

wherein said first setting unit sets said first parameter for deformation processing by selecting either one of a first setting mode in which said first parameter for deformation processing is set based on a relative tilt angle between said reference projector and the screen, and a second setting mode in which said first parameter for deformation processing is set based on a relation between a position of an overlap area in the first projection image before the deformation by said first deformation unit is carried out, and a position of an overlap area in the first projection image after the deformation by said first deformation unit has been carried out;

wherein said secondary projector comprises:

a second deformation unit configured to carry out geometric deformation with respect to a second image to be projected therefrom; and a second setting unit configured to set a second parameter for deformation processing by said second deformation unit; and wherein said second setting unit sets said second parameter for deformation processing based on a relation between a position of an overlap area in the second projection image before the deformation by said second deformation unit is carried out, and a position of an overlap area in the second projection image after the deformation by said second deformation unit has been carried out.

Further features of the present invention will become apparent from the following description of exemplary embodiments with reference to the attached drawings.

BRIEF DESCRIPTION OF THE DRAWINGS

FIG. 4 is a perspective view of a multiple projection system according to the first embodiment of the present invention.

DESCRIPTION OF THE EMBODIMENTS

Hereinafter, preferred embodiments of the present invention will be explained in detail while referring to the accompanying drawings. However, note that the present invention is not limited to the following practical examples.

First Embodiment

In this first embodiment, a projector using a transmissive liquid crystal panel will be explained as an example of projection type display devices. However, the present invention is not limited to such a projector which uses a transmissive liquid crystal panel as a display device. For example, the present invention can also be applied even to those which use a display device such as a DLP (Digital Light Processing) panel, a LCOS (Liquid Crystal On Silicon, reflective liquid crystal) panel, or the like. In addition, in liquid crystal projectors, single-plate type ones, three-plate type ones, etc., are known in general, but any of these types may be used.

The liquid crystal projector of this embodiment projects an image by projecting light from a light source transmitted through liquid crystal elements onto a screen, while controlling the light transmittances of the liquid crystal elements according to the image to be displayed.

In the following, reference will be made to an example in cases where the present invention is applied to such a liquid crystal projector.

<Overall Construction>

First, the overall construction of the liquid crystal projector of this embodiment will be explained by using FIG. 1.

Figure 1:
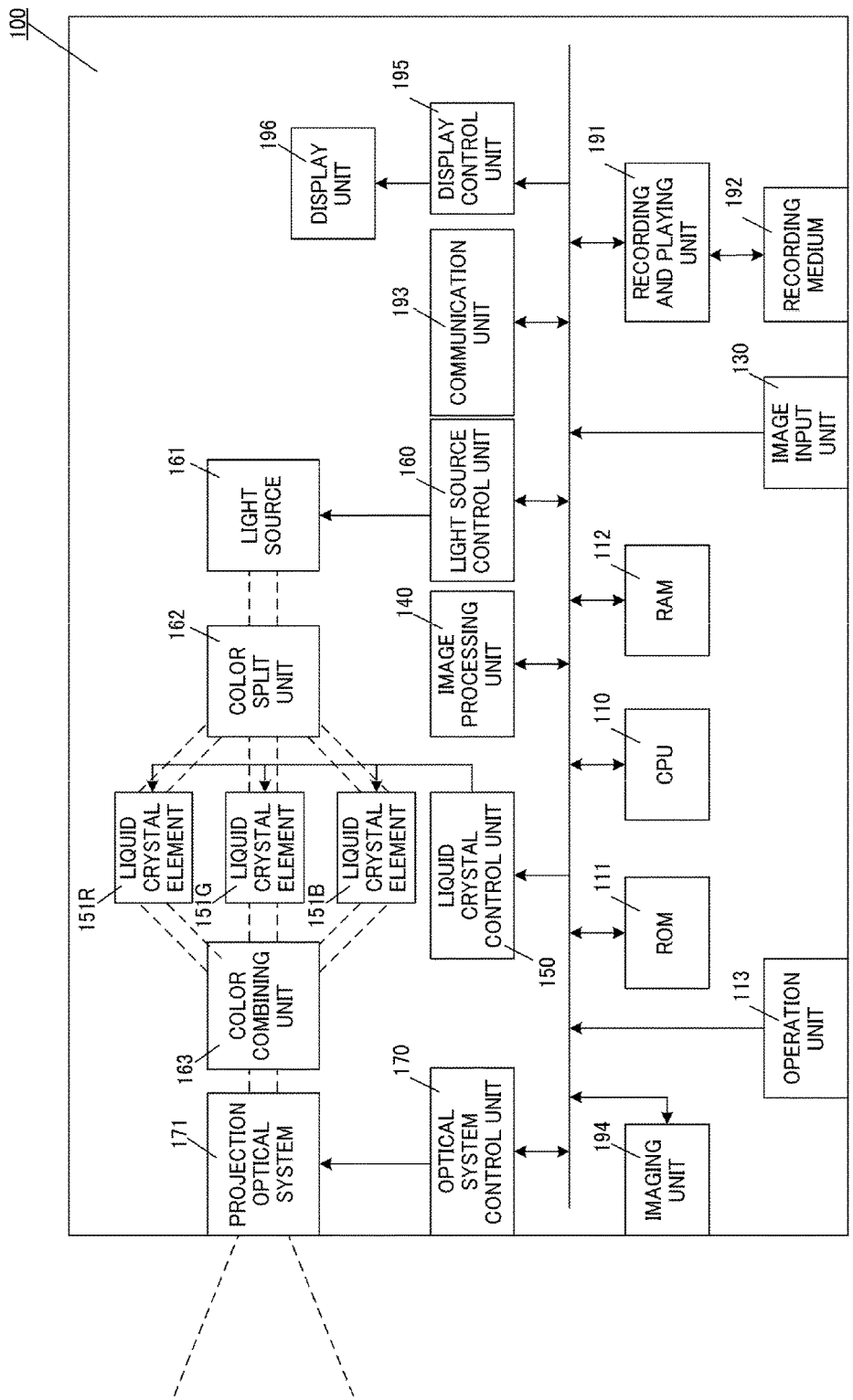
FIG. 1 is a view showing the entire construction of a liquid crystal projector according to embodiments of the present invention.

FIG. 1 is a view showing the construction of an entire liquid crystal projector 100 of this embodiment.

The liquid crystal projector 100 of this embodiment has a CPU 110, a ROM 111, a RAM 112, an operation unit 113, an image input unit 130, and an image processing unit 140. In addition, the liquid crystal projector 100 further has a liquid crystal control unit 150, liquid crystal elements 151R, 151G and 151B, a light source control unit 160, a light source 161, a color split unit 162, a color combining unit 163, an optical system control unit 170, and a projection optical system 171. Also, the liquid crystal projector 100 may further has a recording and playing unit 191, a recording medium 192, a communication unit 193, an imaging unit 194, a display control unit 195, and a display unit 196.

The CPU 110 is to control individual operating blocks of the liquid crystal projector 100, and the ROM 111 is to store control programs in which a processing procedure of the CPU 110 is described. In addition, the RAM 112 temporarily stores the control programs and data as a work memory. In addition, the CPU 110 can also temporarily store still or static image data and moving image data obtained from the recording medium 192 by the recording and playing unit 191 into the RAM 112, and play back individual images and video by using the programs stored in the ROM 111. Moreover, the CPU 110 can also temporarily store static image data and moving image data received from the communication unit 193 into the RAM 112, and play back individual images and video by using the programs stored in the ROM 111. Further, the CPU 110 can temporarily store images and video obtained by the imaging unit 194 into the RAM 112, convert them into static image data and moving image data and record them onto the recording medium 192, by using the programs stored in the ROM 111.

In addition, the operation unit 113 is to receive user's instructions and transmit control signals to the CPU 110, and is composed of a switch, a dial, a touch panel formed on the display unit 196, etc. Also, the operation unit 113 may be one which transmits a prescribed control signal to the CPU 110 based on a signal received by a signal reception unit (e.g., an infrared reception unit, etc.) which receives the signal from a remote controller, for example. Moreover, the CPU 110 receives a control signal inputted from the operation unit 113 or the communication unit 193, and controls the individual operating blocks of the liquid crystal projector 100.

The image input unit 130 receives an image signal from an external device. For example, the image input unit 130 includes a composite connector, an S-video interface, a D-terminal connector, a component terminal, an analog RGB interface, a DVI-I connector, a DVI-D connector, an HDMI (High-Definition Multimedia Interface) (registered trademark) connector, and so on. In addition, upon receiving an analog image signal, the image input unit 130 converts the received analog image signal into a corresponding digital image signal. Then, the image input unit 130 transmits the received image signal to the image processing unit 140. Here, the external device may be anything such as, for example, a personal computer, a camera, a cellular phone, a smart phone, a hard disk recorder, a game machine, and so on, as long as it can output an image signal.

The image processing unit 140 is to carry out processing to change the number of frames, the number of pixels, the shape of image, etc., with respect to the image signal received from the image input unit 130, and to transmit it to the liquid crystal control unit 150, and is composed of a microprocessor for image processing, for example. In addition, the image processing unit 140 does not need to be a dedicated microprocessor, but, for example, the CPU 110 may carry out the same processing as that of the image processing unit 140, by means of the programs stored in the ROM 111. The image processing unit 140 can carry out various kinds of functions such as frame thinning processing, frame interpolation processing, resolution conversion processing, and distortion correction processing (keystone correction processing). Moreover, the image processing unit 140 can also carry out the above-mentioned change processing with respect to an image or video played back by the CPU 110, in addition to the image signal received from the image input unit 130.

The liquid crystal control unit 150 adjusts the transmittances of the liquid crystal elements 151R, 151G, 151B by controlling voltages to be applied to the liquid crystals at pixels of these liquid crystal elements 151R, 151G, 151B based on the image signal which has been processed by the image processing unit 140. The liquid crystal control unit 150 is composed of a microprocessor for control use. In addition, the liquid crystal control unit 150 does not need to be a dedicated microprocessor, but, for example, the CPU 110 may carry out the same processing as that of the liquid crystal control unit 150, by means of the programs stored in the ROM 111. For example, in cases where an image signal is inputted to the image processing unit 140, the liquid crystal control unit 150 controls the liquid crystal elements 151R, 151G, 151B so that their transmittances become corresponding to the image, each time it receives the image of one frame from the image processing unit 140. The liquid crystal element 151R corresponds to a red color, and is for adjusting the transmittance of a red light among the light which has been outputted from the light source 161 and split into a red color (R), a green color (G) and a blue color (B) by the color split unit 162. The liquid crystal element 151G corresponds to a green color, and is for adjusting the transmittance of a green light among the light which has been outputted from the light source 161 and split into the red color (R), the green color (G) and the blue color (B) by the color split unit 162. The liquid crystal element 151B corresponds to a blue color, and is for adjusting the transmittance of a blue light among the light which has been outputted from the light source 161 and split into the red color (R), the green color (G) and the blue color (B) by the color split unit 162.

The specific control operations of the liquid crystal elements 151R, 151G, 151B by this liquid crystal control unit 150 as well as the construction of the liquid crystal elements 151R, 151G, 151B will be described later.

The light source control unit 160 carries out the on/off control of the light source 161 as well as the control of an amount of light thereof, and is composed of a microprocessor for control use. In addition, the light source control unit 160 does not need to be a dedicated microprocessor, but, for example, the CPU 110 may carry out the same processing as that of the light source control unit 160, by means of the programs stored in the ROM 111. Moreover, the light source 161 is to output a light for projecting an image on an unillustrated screen, and is a halogen lamp, a xenon lamp, a high-pressure mercury lamp, etc. Further, the color split unit 162 is to split the light outputted from the light source 161 into the red color (R), the green color (G) and the blue color (B), and is composed of a dichroic mirror, a prism, etc., for example. Here, note that in cases where LEDs (Light Emitting Diodes), etc., corresponding to the individual colors, respectively, are used as the light source 161, the color split unit 162 is unnecessary. In addition, the color combining unit 163 is to combine the lights of the red color (R), the green color (G) and the blue color (B) which have transmitted through the liquid crystal elements 151R, 151G, 151B, respectfully, and is composed of a dichroic mirror, a prism, etc., for example. Then, the light, which is combined from the components of the red color (R), the green color (G) and the blue color (B) by means of the color combining unit 163, is sent to the projection optical system 171. At this time, the liquid crystal elements 151R, 151G, 151B are controlled by the liquid crystal control unit 150 so that they become the transmittances of the light corresponding to the image inputted from the image processing unit 140. For that reason, when the light combined by the color combining unit 163 is projected on the screen by means of the projection optical system 171, an image corresponding to the image inputted by the image processing unit 140 will be displayed on the screen.

The optical system control unit 170 is to control the projection optical system 171, and is composed of a microprocessor for control use. In addition, the optical system control unit 170 does not need to be a dedicated microprocessor, but, for example, the CPU 110 may carry out the same processing as that of the optical system control unit 170, by means of the programs stored in the ROM 111. Moreover, the projection optical system 171 is for projecting a combined light outputted from the color combining unit 163 on the screen. The projection optical system 171 is composed of a plurality of lenses and an actuator for driving the lenses, and can carryout enlargement, reduction, focal point adjustment, etc., of the projection image, by driving the lens by means of the actuator.

The recording and playing unit 191 plays back still or static image data and moving image data from the recording medium 192, and receives, from the CPU 110, static image data and moving image data of the image or video obtained by the imaging unit 194, and records them on the recording medium 192. In addition, the recording and playing unit 191 may record the static image data and the moving image data received from the communication unit 193 onto the recording medium 192. The recording and playing unit 191 is composed, for example, of an interface adapted to be electrically connected to the recording medium 192 and a microprocessor for communicating with the recording medium 192. Also, the recording and playing unit 191 does not need to include a dedicated microprocessor, but, for example, the CPU 110 may carry out the same processing as that of the recording and playing unit 191, by means of the programs stored in the ROM 111. Moreover, the recording medium 192 can record static image data, moving image data, other control data necessary for the liquid crystal projector of this embodiment, and so on. The recording medium 192 may be any type of recording medium such as a magnetic disc, an optical disc, a semiconductor memory, etc., or may be a recording medium which can be detached and attached, or may be a built-in recording medium.

The communication unit 193 is for receiving a control signal, static image data, moving image data, and so on, from external equipment, and may be a wireless LAN unit, a cable LAN unit, a USB unit, a Bluetooth (registered trademark) unit, etc., for example, wherein the system or method of communications thereof is not limited in particular. In addition, if the image input unit 130 has a terminal of HDMI (registered trademark), for example, the communication unit 193 may be one which perform CEC (Consumer Electronics Control) communication through the terminal. Here, the external equipment may be anything such as a personal computer, a camera, a cellular phone, a smart phone, a hard disk recorder, a game machine, a remote controller, etc., as long as it can communicate with the liquid crystal projector 100.

The imaging unit 194 is to acquire an image signal by picking up or photographing the neighborhood or surroundings of the liquid crystal projector 100 of this embodiment, and is able to pickup an image projected through the projection optical system 171 (i.e., photograph in the direction of the screen). The imaging unit 194 transmits an image or video thus obtained to the CPU 110, and the CPU 110 temporarily stores the image or video into the RAM 112, and converts it into static image data or moving image data based on the programs stored in the ROM 111. The imaging unit 194 is composed of a lens with which an optical image of a photographic object is acquired, an actuator for driving the lens, a microprocessor for controlling the actuator, an image sensor for converting the optical image into a corresponding image signal, an A/D conversion unit for converting the image signal into a corresponding digital signal, and so on. In addition, the imaging unit 194 is not limited to one which photographs in the direction of the screen, but may photograph a viewer side in the opposite direction of the screen, for example.

The display control unit 195 is to carry out control for displaying images such as an operation screen, a switch icon, and so on for operating the liquid crystal projector 100 onto the display unit 196 provided on the liquid crystal projector 100, and is composed of a microprocessor, etc., which performs display control. In addition, such a microprocessor does not need to be a dedicated one, but, for example, the CPU 110 may carry out the same processing as that of the display control unit 195, by means of the programs stored in the ROM 111. Also, the display unit 196 is to display the operation screens, switch icons and so on for operating the liquid crystal projector 100. The display unit 196 may be anything as long as it can display images. For example, the display unit 196 may be a liquid crystal display, a CRT display, an organic EL display, or an LED display. Moreover, the display unit 196 may be something which causes an LED corresponding to each button to emit light, in order to present a specific button to a user in an easily recognizable manner.

Here, note that the image processing unit 140, the liquid crystal control unit 150, the light source control unit 160, the optical system control unit 170, the recording and playing unit 191, and the display control unit 195 according to this embodiment may each be a single microprocessor or a plurality of microprocessors which can carry out the same processing as that of each of these blocks or units. Alternatively, for example, the CPU 110 may carry out the same processing as that of each block by means of the programs stored in the ROM 111.

<Basic Operation>

Next, reference will be made to the basic operation of the liquid crystal projector 100 of this embodiment, while using FIG. 1 and FIG. 2.

Figure 2:
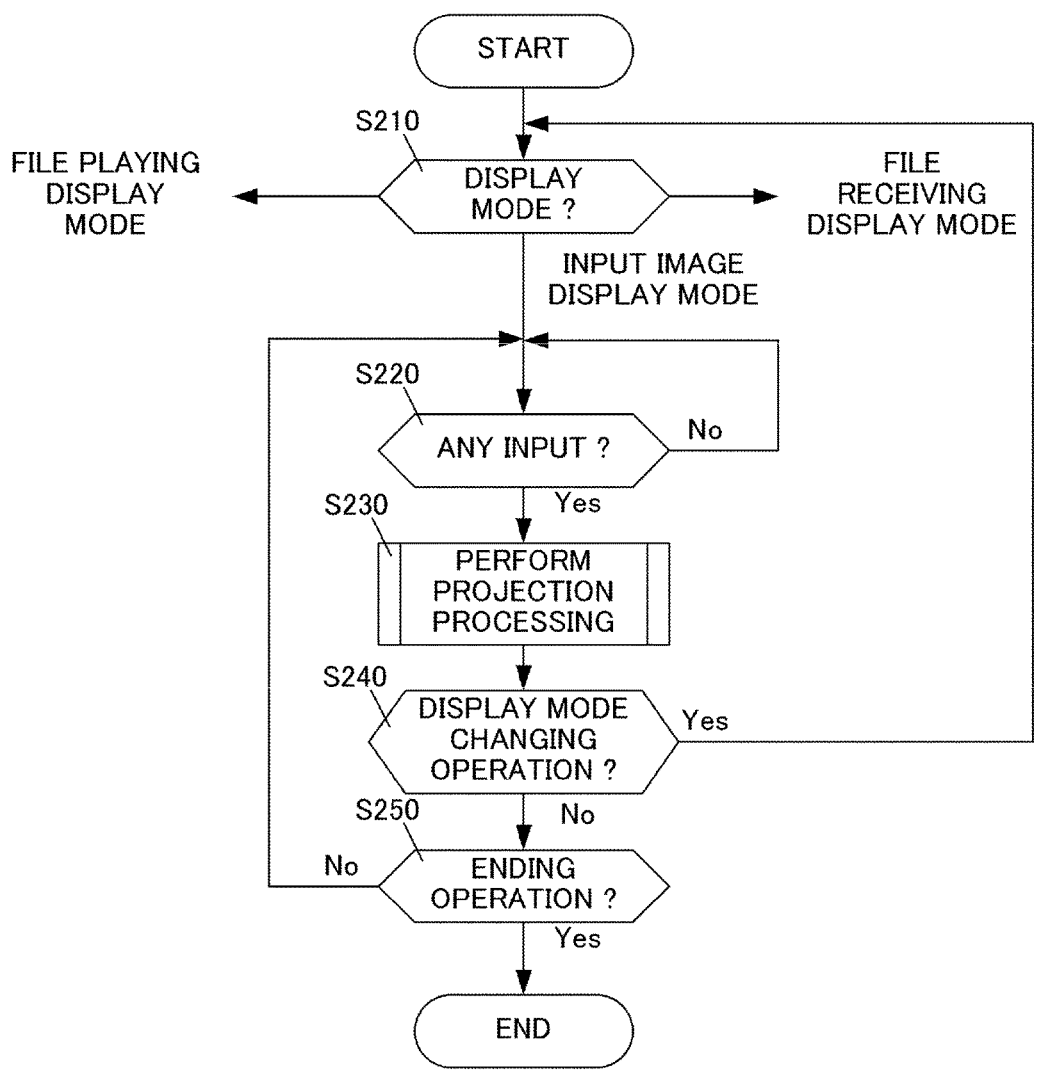
FIG. 2 is a flow chart for the control of a basic operation of the liquid crystal projector according to the embodiments of the present invention.

FIG. 2 is a flow chart for explaining the control of the basic operation of the liquid crystal projector 100 of this embodiment. The operation shown in FIG. 2 is basically carried out by the CPU 110 controlling each functional block based on the programs stored in the ROM 111. The flow chart of FIG. 2 is assumed to be started at a point in time at which the user has instructed to turn on the power supply of the liquid crystal projector 100 by means of the operation unit 113 or an unillustrated remote controller.

When the user instructs to turn on the power supply of the liquid crystal projector 100 by the use of the operation unit 113 or the unillustrated remote controller, the CPU 110 operates to supply electric power from an unillustrated power supply unit to the individual parts or units of the projector 100 through an unillustrated power supply circuit.

Then, the CPU 110 determines a display mode which has been selected by the user's operation of the operation unit 113 or the remote controller (step S210). One of the display modes of the projector 100 of this embodiment is an "input image display mode" in which images inputted from the image input unit 130 are displayed. In addition, one of the display modes of the projector 100 of this embodiment is a "file playing display mode" in which images or videos of static image data or moving image data read out from the recording medium 192 by the recording and playing unit 191 are displayed. Moreover, one of the display modes of the projector 100 of this embodiment is a "file receiving display mode" in which images or videos of static image data or moving image data received from the communication unit 193 are displayed. Here, note that in this embodiment, a description will be given to a case where a display mode is selected by the user, but a display mode at the point in time of turning on the power supply may be a display mode at the time of the last end (i.e., the last turn-off of the power supply), or may also be one of the above-mentioned display modes as a default display mode. In that case, the processing of step S210 can be omitted.

Here, the following description will be made on the assumption that in step S210, the "input image display mode" has been selected.

When the "input image display mode" is selected, the CPU 110 determines whether an image has been inputted from the image input unit 130 (step S220). In cases where no image has been inputted (i.e., No in step S220), the CPU 110 waits until an input image signal is detected, whereas in cases where an image has been inputted (Yes in step S220), the CPU 110 carries out projection processing (step S230).

The CPU 110 transmits the image inputted from the image input unit 130 to the image processing unit 140 as projection processing, causes the image processing unit 140 to carry out the deformation or change of the number of pixels, the frame rate and the shape of the image, and transmits the image for one screen thus processed to the liquid crystal control unit 150. Then, the CPU 110 causes the liquid crystal control unit 150 to control the transmittances of the liquid crystal elements 151R, 151G, 151B so that they become the transmittances corresponding to the gradation levels of the individual color components of the red color (R), the green color (G) and the blue color (B) of the received image for one screen. Also, the CPU 110 causes the light source control unit 160 to control the output of light from the light source 161. The color split unit 162 splits the light outputted from the light source 161 into a red (R) light, a green (G) light and a blue (B) light, and supplies the thus split lights to the liquid crystal elements 151R, 151G, 151B, respectively. The lights of the individual colors supplied to the liquid crystal elements 151R, 151G, 151B are limited in their amounts of transmitting lights for each pixel of the liquid crystal panel. Then, the individual lights of the red (R) color, the green color (G) and the blue color (B) having transmitted through the liquid crystal elements 151R, 151G, 151B are supplied to the color combining unit 163 in which they are combined again. Subsequently, the light combined by the color combining unit 163 is projected on the unillustrated screen through the projection optical system 171.

This projection processing is carried out in a sequential manner for each image of one frame, during the time of projecting the image.

When an instruction for operating the projection optical system 171 by the user is inputted from the control unit 113, the CPU 110 causes the optical system control unit 170 to control the actuator of the projection optical system 171 so as to change the focus of the projection image or the enlargement (magnification) ratio of the optical system according to the content of the instruction.

In the course of execution of this projection processing, the CPU 110 determines whether an instruction for changing the display mode is inputted from the control unit 113 by the user (step S240). Here, when an instruction for changing the display mode is inputted from the control unit 113 by the user (i.e., Yes in step S240), the processing of the CPU 110 returns to step S210 again, in which the determination of the display mode is carried out. At this time, the CPU 110 transmits a menu screen for selecting a display mode to the image processing unit 140 as an OSD (On Screen Display) image, and controls the image processing unit 140 in such manner that this OSD screen is made to superpose onto the image being projected. In this manner, the user can select a display mode, while looking at this projected OSD screen.

On the other hand, in cases where an instruction for changing the display mode is not inputted from the control unit 113 by the user during the execution of display processing (No in step S240), the CPU 110 determines whether an instruction for ending or finishing the projection is inputted from the control unit 113 by the user (step S250). Here, in cases where an instruction for finishing the projection is inputted from the control unit 113 by the user (Yes in step S250), the CPU 110 stops feeding electric power to the individual blocks or units of the projector 100, and finishes the image projection. On the other hand, in cases where an instruction for finishing the projection is not inputted from the control unit 113 by the user (No in step S250), the processing of the CPU 110 returns to step S220, so that the processings from step S220 to step S250 are henceforth carried out in a repeated manner until an instruction for finishing the projection is inputted from the control unit 113 by the user.

In the above-mentioned manner, the liquid crystal projector 100 of this embodiment projects the image onto the screen.

Here, note that in the "file playing display mode", the CPU 110 causes the recording and playing unit 191 to read out a file list of static image data or moving image data, or read out thumbnail data of each file from the recording medium 192, and to temporarily store them into the RAM 112. Then, the CPU 110 generates character images based on the file list temporarily stored in the RAM 112, or images based on the thumbnail data of each file, by means of the programs stored in the ROM 111, and transmits them to the image processing unit 140. Thereafter, the CPU 110 controls the image processing unit 140, the liquid crystal control unit 150, and the light source control unit 160, similar to the ordinary projection processing (step S230).

The user carries out an operation of selecting static image data or moving image data wanted to be played back through the operation unit 113, while looking at a GUI which is composed of the characters, images or the like which correspond to static image data or moving image data stored in the recording medium 192 and which have been displayed on the projection image. In that case, the CPU 110 controls the recording and playing unit 191 so that the static image data or the moving image data thus selected can be read out from the recording medium 192. Then, the CPU 110 temporarily stores the static image data or the moving image data thus readout into the RAM 112, and plays back the images or videos of the static image data or the moving image data based on the programs stored in the ROM 111.

Then, the CPU 110 transmits, for example, images for each frame of the thus played back moving image data to the image processing unit 140 in a sequential manner, and controls the image processing unit 140, the liquid crystal control unit 150, and the light source control unit 160, similar to the ordinary projection processing (step S230). In addition, in cases where the static image data are played back, the CPU 110 transmits the played back images to the image processing unit 140, and controls the image processing unit 140, the liquid crystal control unit 150, and the light source control unit 160, similar to the ordinary projection processing (step S230).

In addition, in the "file receiving display mode", the CPU 110 temporarily stores the static image data or the moving image data received from the communication unit 193 into the RAM 112, and plays back images or videos of the static image data or the moving image data based on the programs stored in the ROM 111. Then, the CPU 110 transmits, for example, images for each frame of the thus played back moving image data to the image processing unit 140 in a sequential manner, and controls the image processing unit 140, the liquid crystal control unit 150, and the light source control unit 160, similar to the ordinary projection processing (step S230). Moreover, in cases where the static image data are played back, the CPU 110 transmits the played back images to the image processing unit 140, and controls the image processing unit 140, the liquid crystal control unit 150, and the light source control unit 160, similar to the ordinary projection processing (step S230).

Next, reference will be made to a characteristic configuration of this embodiment.

Figure 3:
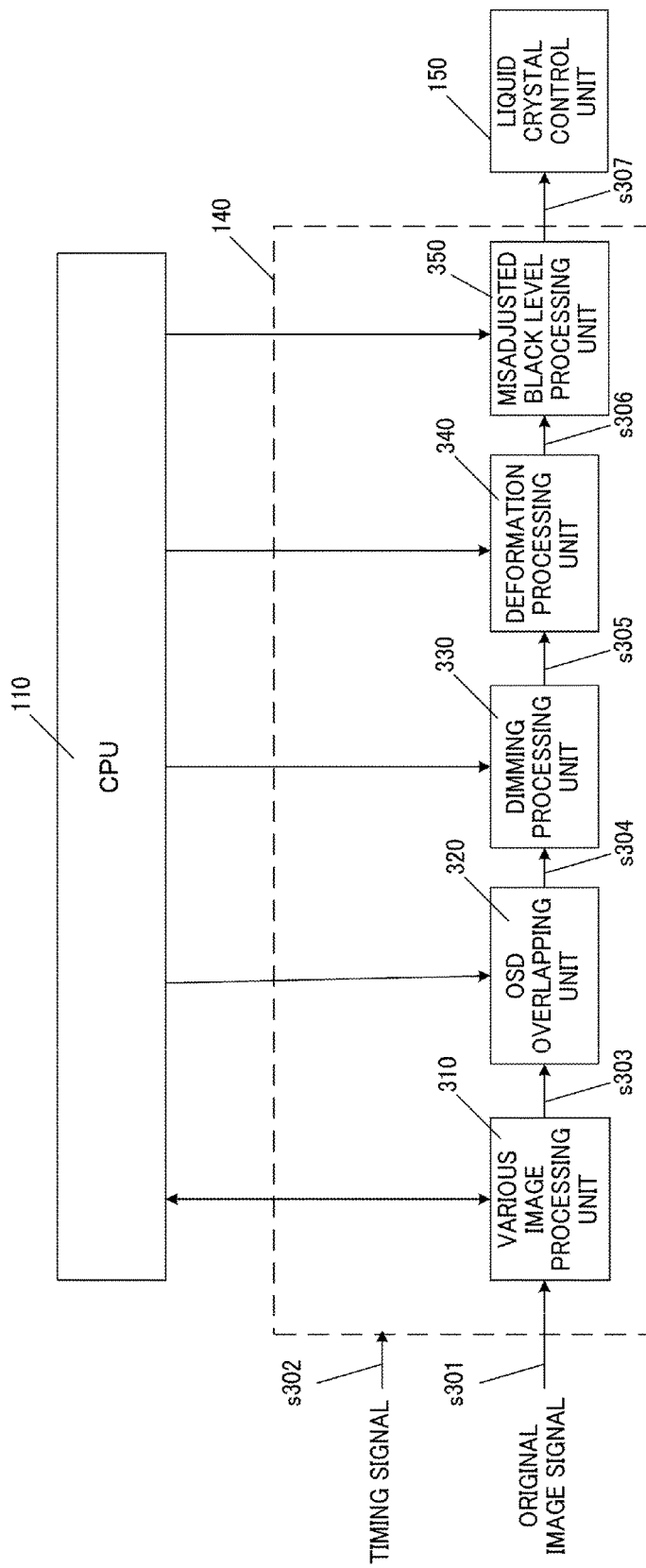
FIG. 3 is a view showing the internal construction of an image processing unit according to a first embodiment of the present invention.

FIG. 3 is a block diagram for explaining an internal configuration of the image processing unit 140 in FIG. 1.

The image processing unit 140 includes a various image processing unit 310, an OSD superimposing unit 320, a dimming processing unit 330, a deformation processing unit 340, and a misadjusted black level processing unit 350.

An original image signal s301 is inputted from the image input unit 130, the recording and playing unit 191, the communication unit 193, etc., according to the display mode, as mentioned above. In addition, a timing signal s302 is a signal such as a vertical synchronizing signal, a horizontal synchronizing signal, a clock, etc., synchronized with the original image signal s301, and is supplied from a supply source of the original image signal s301. Although the individual blocks or units in the image processing unit 140 operate based on the timing signal s302, the timing signal may be remade and used inside the image processing unit 140.

The various image processing unit 310 cooperates with the CPU 110, so that the original image signal s301 is inputted thereto, and is then subjected to various image processing to generate an image processing signal s303 and to output it to the OSD superimposing unit 320. The various image processing is processing of acquiring statistical information such as a histogram or APL (average picture level) of the image signal, or processing such as IP conversion, frame rate conversion, resolution conversion, γ conversion, color gamut conversion, color correction, edge enhancement, and so on. Here, note that the details of the above image processing are well known, and hence the explanation thereof will be omitted.

The OSD superimposing unit 320 superimposes a menu constituting a GUI for user's operation or an OSD image showing information for operation support with the image processing signal s303 according to an instruction of the CPU 110, and outputs an OSD superimposed signal s304 thus generated to the dimming processing unit 330.

The dimming processing unit 330 carries out dimming (light reduction) processing for edge blending with respect to the OSD superimposing signal s304 received from the OSD superimposing unit 320 according to an instruction of the CPU 110, and outputs an overlapped portion dimming signal s305 thus generated to the deformation processing unit 340. The dimming processing unit 330 applies, as dimming processing, a gain that serves to gradually reduce the light (intensity) from a boundary with a non-overlap area toward an end in an overlap area of multiple projections.

The details of the processing of the dimming processing unit 330 will be explained by using FIG. 4 and FIGS. 5A through 5D. In order to simplify the explanation, the following description will be made in a state where projectors and a screen are arranged in their correct positions (i.e., in face to face relation with respect to each other).

FIG. 4 shows a perspective view of a multiple projection system (image projection system) according to this embodiment of the present invention.

In this figure, an image signal source 400 is connected to projectors 420a, 420b through image cables 410a, 410b, respectively, so that it supplies image signals to them. The projectors 420a, 420b project images on the screen 430 which is a plane of projection.

The projectors 420a, 420b receive the image signals transmitted from the image signal source 400 through the image cables 410a, 410b respectively. The projectors 420a, 420b project one integrated large image by projecting the images based on the received image signals in such a manner that the images are partially overlapped with each other. Such a projection method is referred to as multiple projections.

Figure 5A:
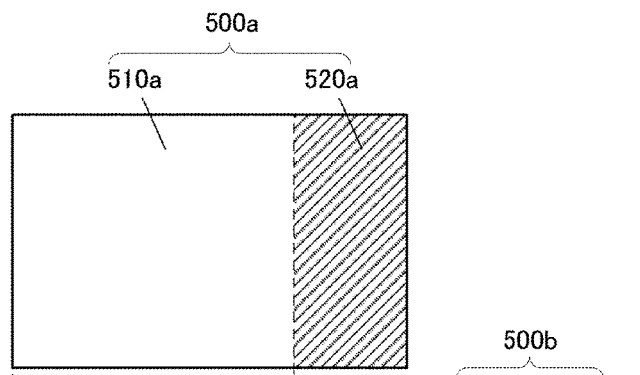
FIGS. 5A through 5D are views for explaining the processing of a light dimming processing unit according to the first embodiment of the present invention.
Figure 5B:
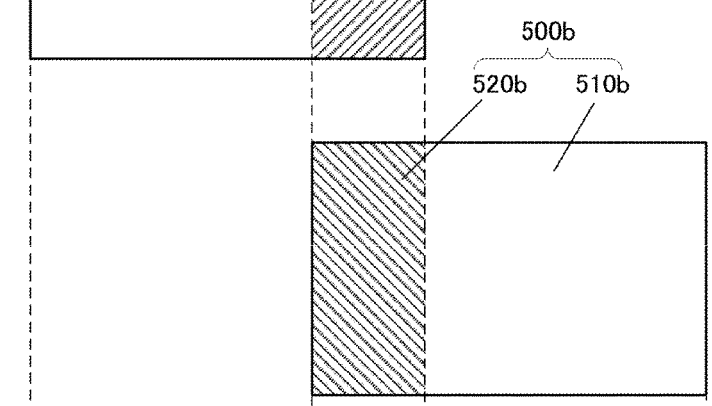

FIG. 5A shows a projection image 500a projected by the projector 420a. The projection image 500a is composed of a non-overlap area 510a and an overlap area 520a. FIG. 5B shows a projection image 500b projected by the projector 420b. The projection image 500b is composed of a non-overlap area 510b and an overlap area 520b.

Figure 5C:
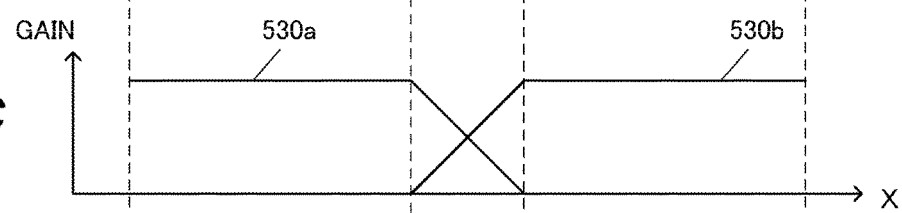

Graphs 530a, 530b shown in FIG. 5C indicate gains which are applied to OSD superimposing signals s304 by means of the dimming processing unit 330 of each of the projectors 420a, 420b. In this embodiment, the gains are set such that in the non-overlap areas 510a, 510b, they are 1.0, and in the overlap areas 520a, 520b, they are also 1.0 at their boundaries with the non-overlap areas, but are 0 at an end of each projection image, and are a value in a range therebetween which is determined according to a position in the lateral or horizontal direction. Although FIG. 5C shows an example in which the gains change linearly from the boundaries between the overlap area and the non-overlap area to an end of each projection image, as long as a sum of luminances or intensities in the overlap areas becomes the same as a luminance or intensity in each of the non-overlap areas, the change of the gains is not limited to such a linear change, but may be an S-shaped curve. etc.

Figure 5D:
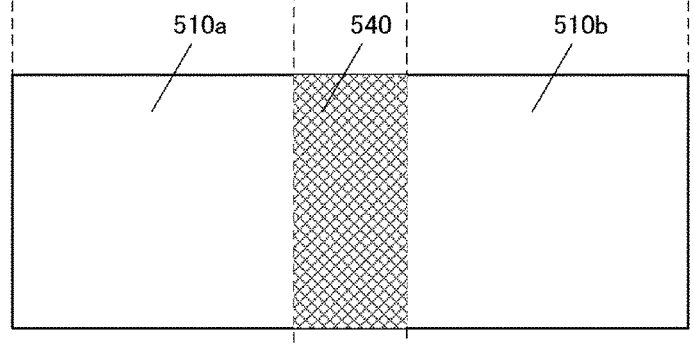

FIG. 5D shows an integrated projection image 500a projected by the multiple projection. An overlap area 540 is an area in which the overlap areas 520a, 520b of the individual projectors 420a, 420b are overlapped with each other, and has the same luminance or intensity as that of the non-overlap areas 510a, 510b, so the boundaries of the overlap area 540 are inconspicuous or unnoticeable.

Based on a deformation formula, the deformation processing unit 340 carries out geometric deformation processing on the overlapped portion dimming signal s305, and outputs a deformed image signal s306. Because the keystone correction can be achieved by projective transformation, the deformation processing unit 340 inputs parameters for projective transformation from the CPU 110. Assuming that the coordinates of the original image are (xs, ys), the coordinates (xd, yd) of the deformed image are represented by the following expression 1.

$$\begin{bmatrix} xd \\ yd \\ 1 \end{bmatrix} = M \begin{bmatrix} xs - xso \\ ys - yso \\ 1 \end{bmatrix} + \begin{bmatrix} xdo \\ ydo \\ 0 \end{bmatrix} \quad \text{[Expression 1]}$$

Figure 15:
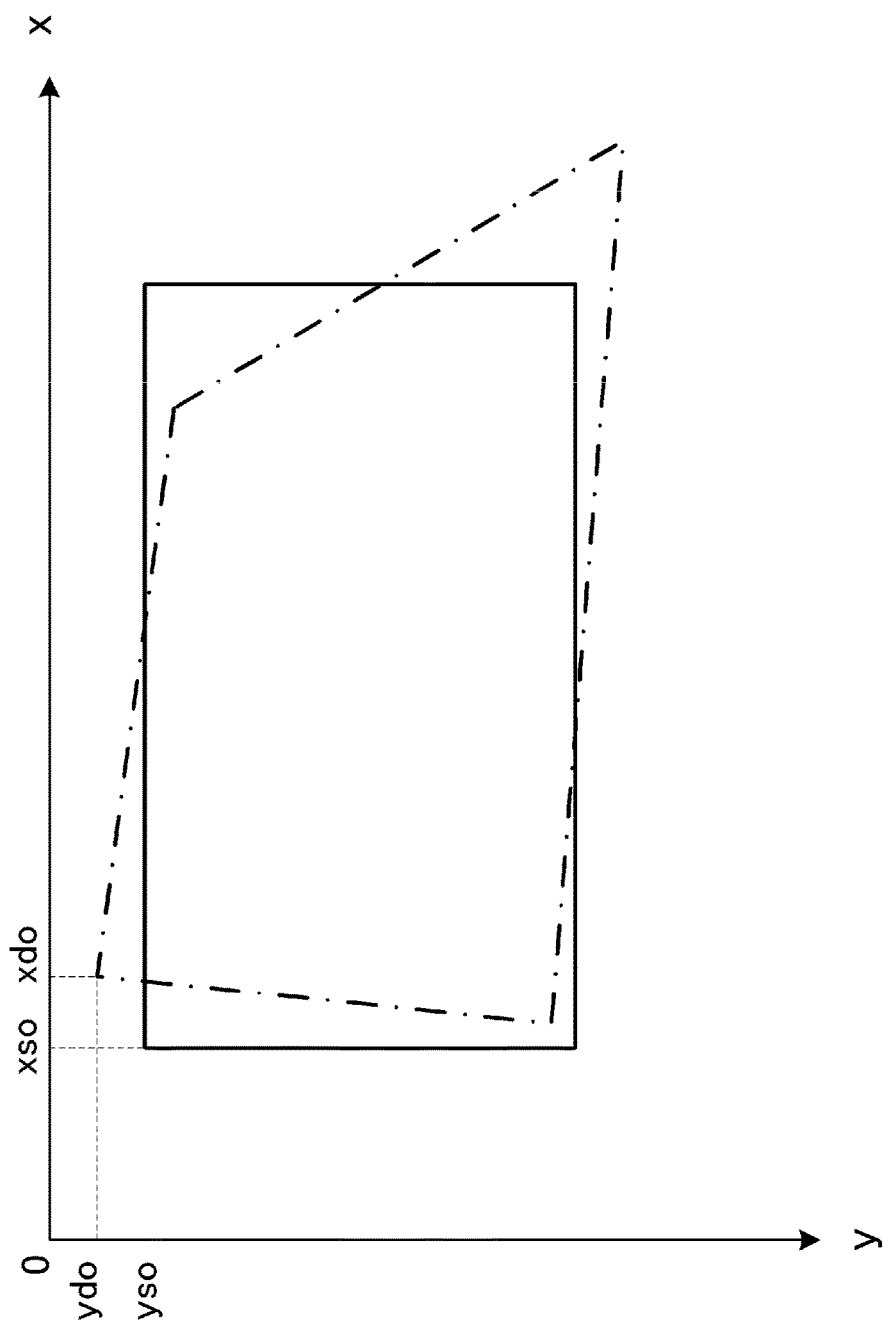
FIG. 15 is a view for explaining projective transformation

Here, M is a 3×3 matrix, and is a projective transformation matrix from the original image inputted from the CPU 110 to the deformed image. (xso, yso) are coordinates of one vertex of the original image shown by a solid line in FIG. 15, and (xdo, ydo) are the coordinate values of a vertex of the deformed image, shown by an alternate long and short dash line in FIG. 15, corresponding to the vertex (xso, yso) of the original image.

An inverse matrix $M^{-1}$ of a matrix M of the expression 1 and an offset (xso, yso), (xdo, ydo) are inputted from the CPU 110, and coordinates (xs, ys) of the original image corresponding to the coordinate values (xd, yd) after deformation are obtained according to the following expression 2.

$$\begin{bmatrix} xs \\ ys \\ 1 \end{bmatrix} = M^{-1} \begin{bmatrix} xd - xdo \\ yd - ydo \\ 1 \end{bmatrix} + \begin{bmatrix} xso \\ yso \\ 0 \end{bmatrix} \quad \text{[Expression 2]}$$

When the coordinates of the original image obtained based on the expression 2 become integers, a pixel value at the coordinates (xs, ys) of the original image may also be used as a pixel value at the coordinates (xd, yd) after conversion thereof as it is. However, the coordinates of the original image obtained based on the expression 2 do not necessarily become integers, and hence, the pixel value at the coordinates (xd, yd) after deformation is obtained by being interpolated with the use of the values of neighboring peripheral pixels. As a method of interpolation, there may be used a bilinear method, a bicubic method, or any other arbitrary interpolation method. In addition, in cases where the coordinates of the original image obtained based on the expression 2 are out of the range of an original image area, the pixel value thereof at the coordinates is made to be a black color or a background color set by the user.

In this manner, the deformation processing unit 340 obtains pixel values at all the coordinates after conversion, and creates a converted image.

In the above-mentioned description, it has been assumed that the matrix M and its inverse matrix $M^{-1}$ are inputted from the CPU 110 to the image processing unit 140. However, only the inverse matrix $M^{-1}$ may be inputted, and the matrix M may be obtained inside the image processing unit 140, or only the matrix M may be inputted, and the inverse matrix $M^{-1}$ may be obtained inside the image processing unit 140.

The deformed image signal s306 outputted by the deformation processing unit 340 is supplied to the misadjusted black level processing unit 350. In the projector, a misadjusted black level (greyish black) occurs due to leakage light even if a black image is displayed, an amount of misadjusted black level in the overlap area becomes a total sum of amounts of misadjusted black levels for the number of projection images (i.e., the number of the projectors) overlapped with one another in the overlap area. For that reason, the black in the overlap area will be displayed more brightly than the black in the non-overlap areas. In the misadjusted black level processing unit 350, signal processing to increase luminance in the non-overlap areas is carried out on the deformed image signal s306, so as to make the black in the non-overlap areas equivalent to that in the overlap area, and a misadjusted black level corrected image signal s307 is outputted.

The misadjusted black level corrected image signal s307 is supplied to the liquid crystal control unit 150, so that it is displayed on the liquid crystal elements 151R, 151G, 151B, as referred to above.

Next, reference will be made to a four-corner correcting operation according to this embodiment by using FIGS. 6 through 12.

Figure 6:
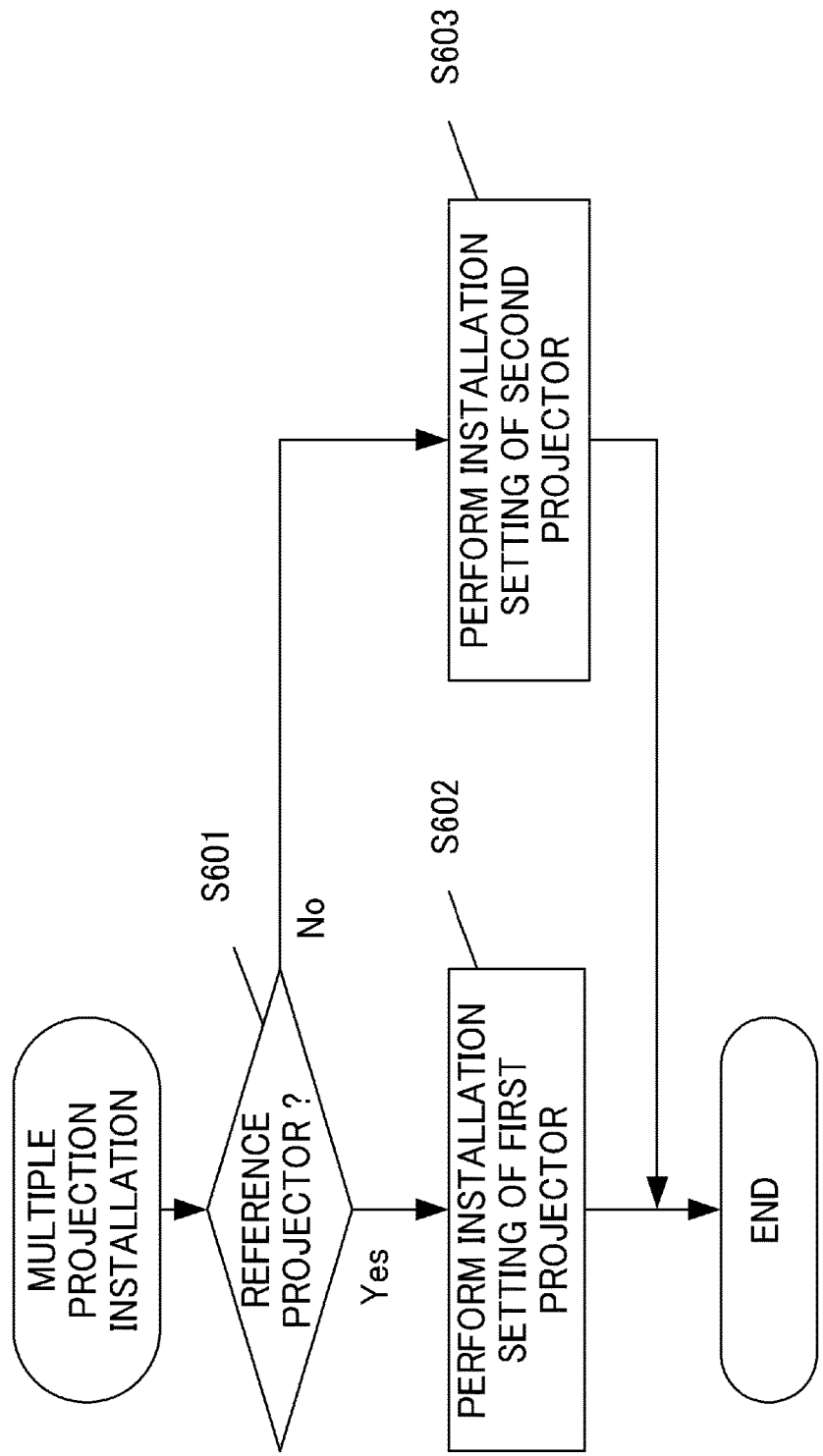
FIG. 6 is a flow chart for explaining multiple projection installation processing according to the first embodiment of the present invention.

FIG. 6 is a flow chart which is carried out by the CPU 110 in each of the projectors 420a, 420b. The operation of FIG. 6 is activated in cases where the user inputs an instruction to start settings for multiple projections by means of the operation unit 113 or an unillustrated remote controller.

Figure 7A:
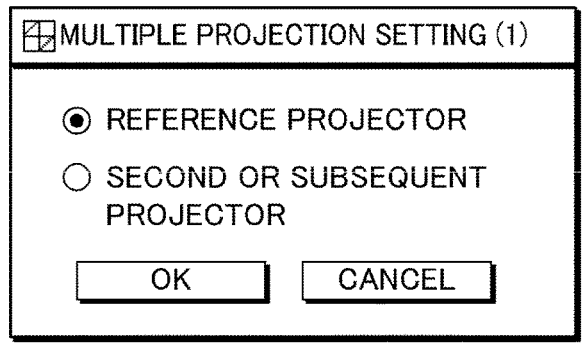
FIGS. 7A through 7D are examples of a menu display according to the first embodiment of the present invention.

First, the CPU 110 instructs the OSD superimposing unit 320 to display a multiple projection setting menu as shown in FIG. 7A. Then, let the user select a first projector (reference projector) to be used as a reference for multiple projection or a secondary projector (subordinate projector) which is to be set according to the reference projector (step S601).

In cases where the projector used as the reference is selected (S601: Yes), the CPU 110 carries out an installation setting for the first projector (installation setting for the reference projector) (step S602). In cases where the reference projector is not selected (S601: No), the CPU 110 carries out an installation setting for the secondary projector (installation setting for each of the subordinate projectors) (step S603).

Even if either of the above processes is carried out, processing of this flow chart is ended by completion of each installation setting.

Figure 8:
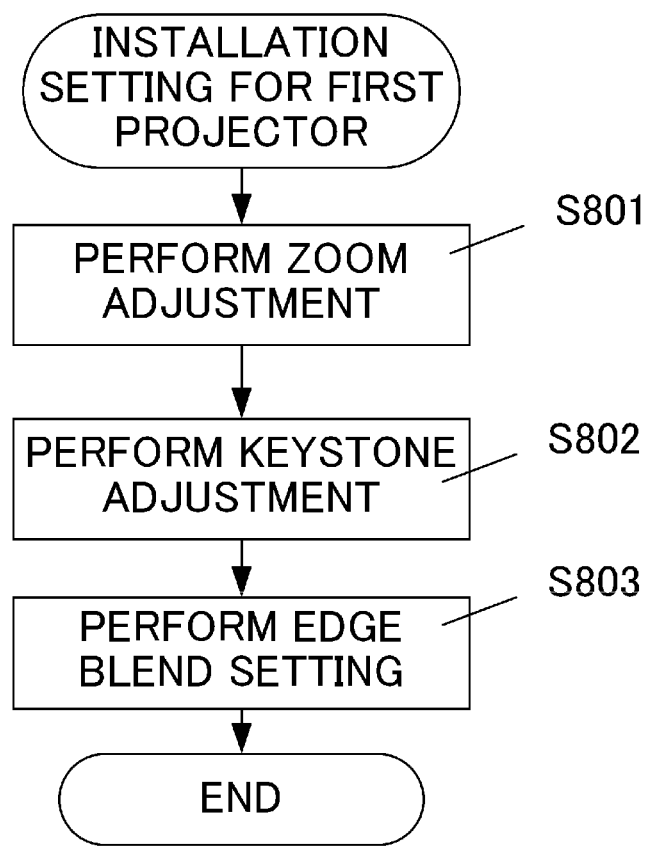
FIG. 8 is a flow chart for showing reference projector installation processing according to the first embodiment of the present invention.

A flow chart of processing for the installation setting of the first projector (the reference projector) in step S602 is shown in FIG. 8.

Figure 7B:
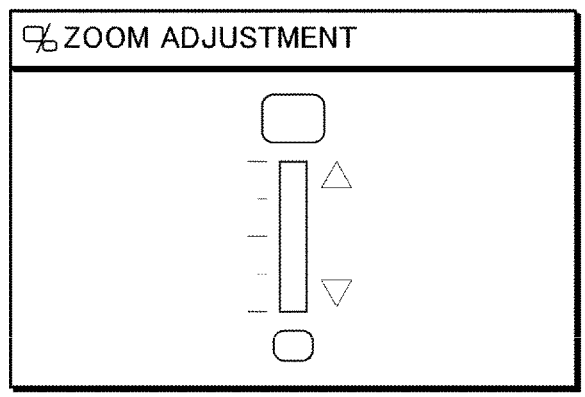

First, the CPU 110 instructs the OSD superimposing unit 320 to display a zoom adjustment menu as shown in FIG. 7B, so that the user can carry out a zoom adjustment (step S801).

Figure 9A:
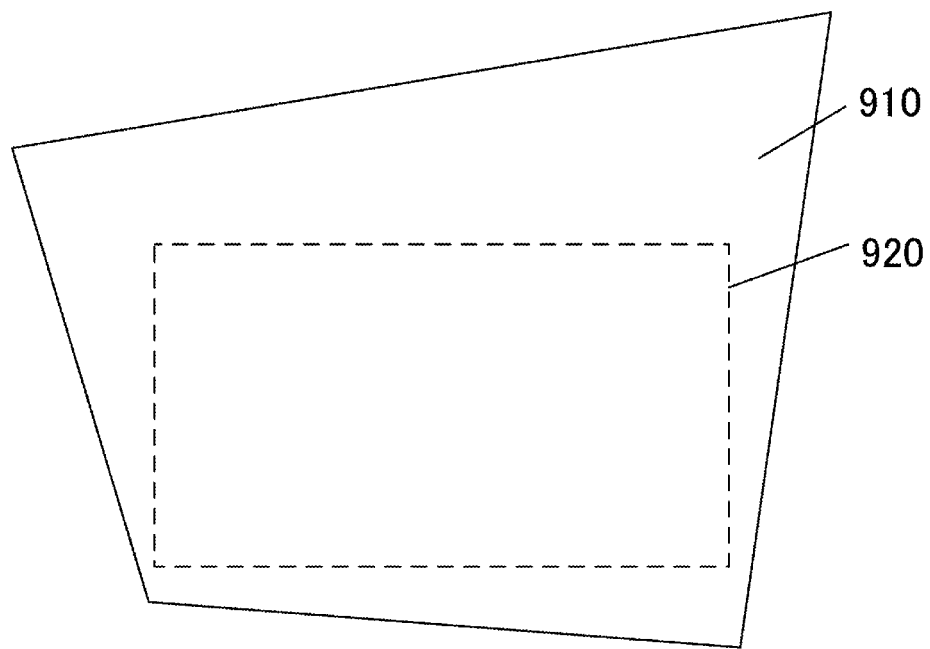
FIGS. 9A through 9D are views showing a change of a projection image by the reference projector installation processing according to the first embodiment of the present invention.
Figure 9B:
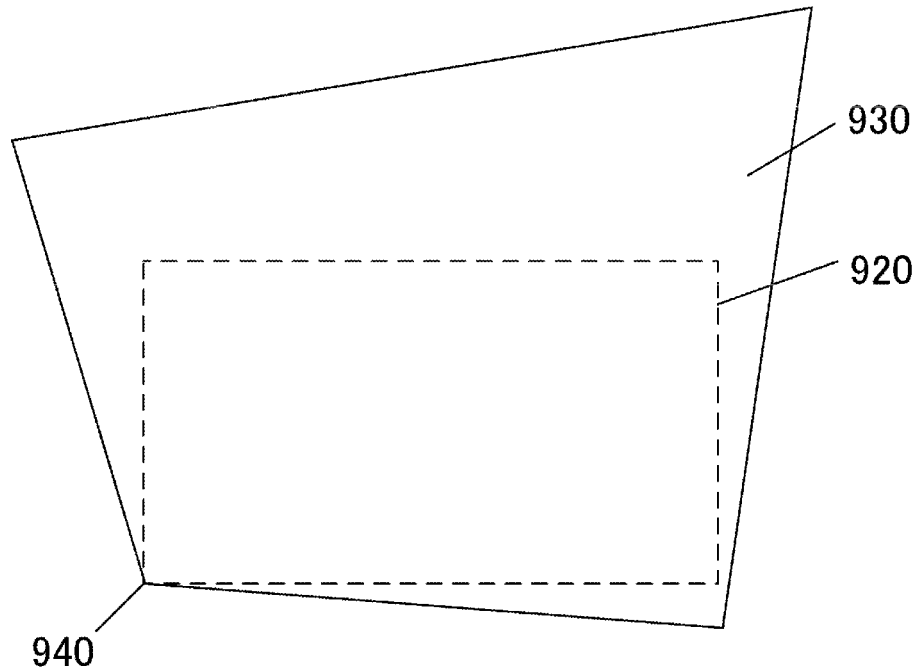

FIGS. 9A through 9D are views each showing a projection area on a screen according to the first projector. In FIG. 9A, reference numeral 910 denotes a projection image before correction, and reference numeral 920 indicated by a broken line is a desired projection area in the form of a target. The user carries out a zoom adjustment by adjusting an amount of zoom by means of the operation unit 113 or the unillustrated remote controller, so that a projection image 930 after zoom adjustment of a projector includes the desired projection area 920 and has one vertex (a lower left vertex in an example of FIG. 9B which is in coincidence with a vertex of the projection image before zoom adjustment, as shown in FIG. 9B. The projector body of the first projector may be moved if necessary.

Figure 7C:
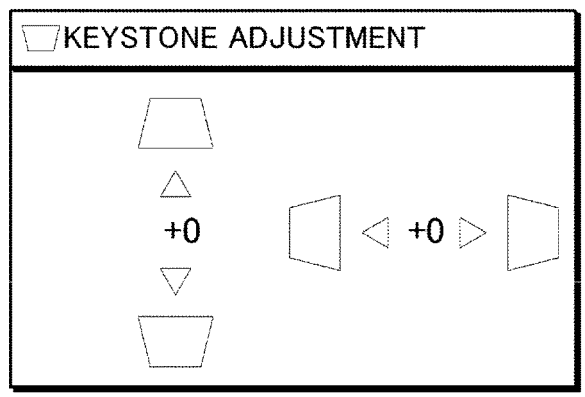

Then, the CPU 110 instructs the OSD superimposing unit 320 to display a vertical and horizontal keystone adjustment menu as shown in FIG. 7C, so that the user can carry out a keystone adjustment (step S802). A vertical and horizontal keystone correction is a conventional keystone correction in which the user gives a relative tilt angle between a screen and a projector as a setting value by means of the GUI, so that the CPU 110 calculates coordinates after correction based on the relative tilt angle, and sets them into the deformation processing unit 340. In the vertical and horizontal keystone correction, parameters for deformation processing are set based on a relative tilt angle between each projector and the screen. The setting of the deformation processing according to the vertical and horizontal keystone correction is referred to as a first setting mode.

Figure 9C:
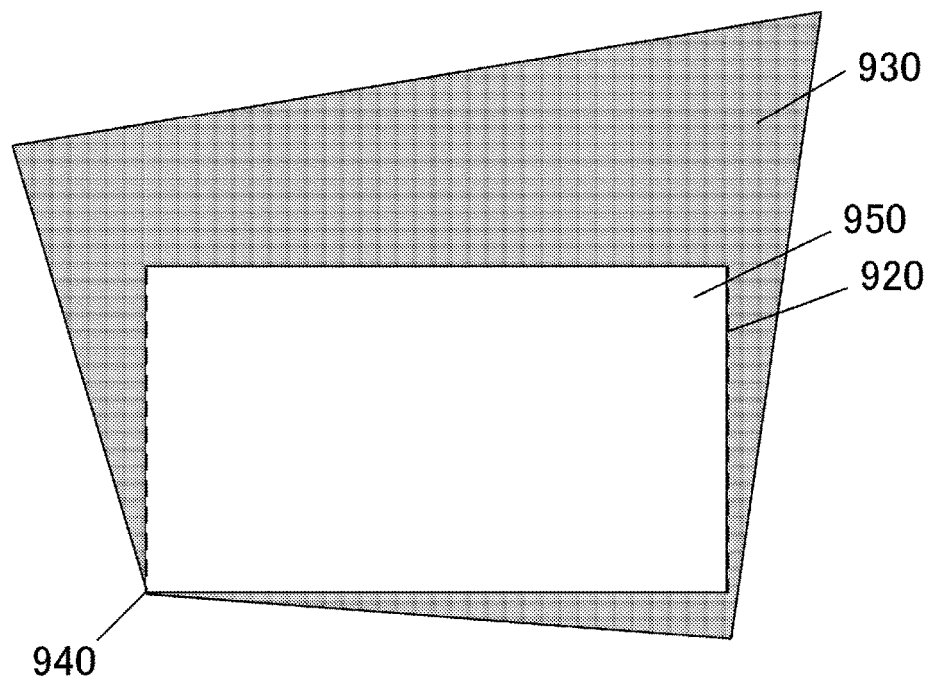

This keystone correction should be carried out in such a manner that one vertex (e.g., a vertex 940 in the lower left shown in FIG. 9B in the case of this embodiment) of a projection image area does not move. For that reason, in this embodiment, in a state where adjustment has been made in such a manner that a projection image becomes a rectangular shape in a plane of projection according to the vertical and horizontal keystone correction, the desired projection area 920 and a projection image 950 after the keystone correction become coincident with each other, as shown in FIG. 9C. In a region outside of the projection image 950 after the keystone correction, black is displayed.

In the case of a projector having a different keystone correction algorithm mounted thereon, it can be dealt with by changing an adjustment method for the zoom adjustment in step S801.

Figure 7D:
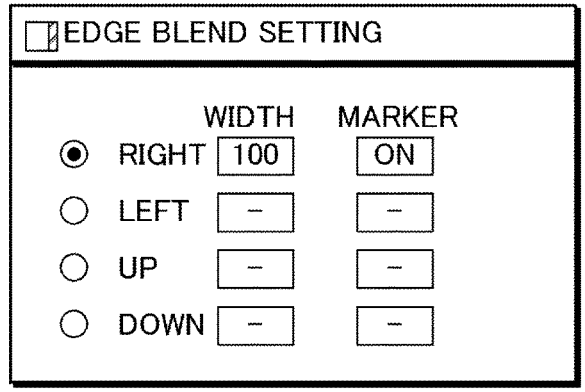

Subsequently, the CPU 110 instructs the OSD superimposing unit 320 to display an edge blend setting menu as shown in FIG. 7D, so that the user can carry out an edge blend setting (step S803). In cases where the projector 420a in FIG. 4 is set as the reference projector, right-hand side edge blend is herein validated and a width of the overlap area is set. The width of the overlap area is a width of the overlap area which has been set in the image signals supplied to the projectors 420a, 420b from the image signal source 400, and is a known amount.

Figure 9D:
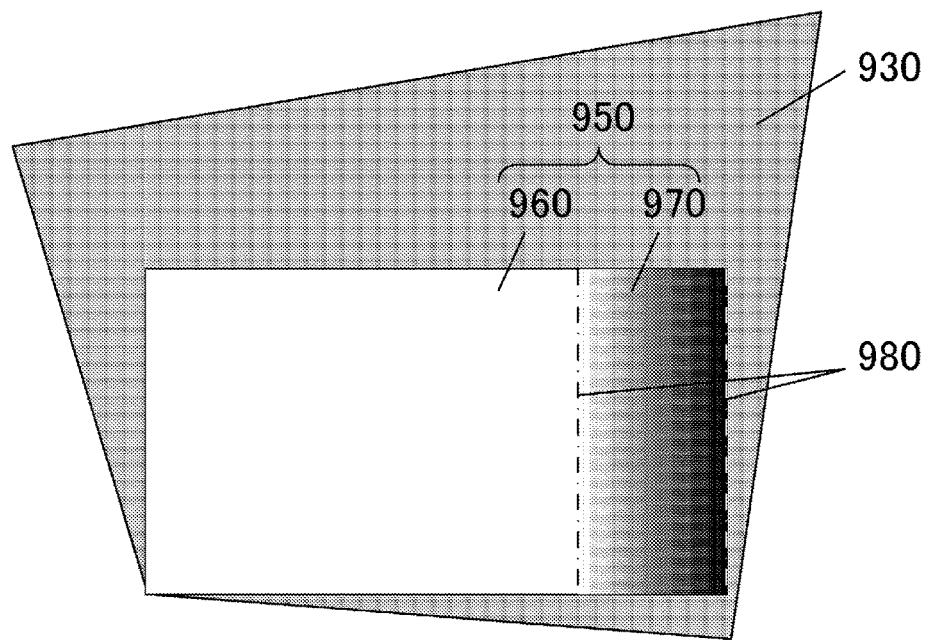

Then, the CPU 110 displays edge blend markers as guides for carrying out alignment or registration of a second projector. The projection image after edge blend setting becomes as shown in FIG. 9D. In this figure, reference numeral 960 denotes a non-overlap area on the screen after the keystone correction, and reference numeral 970 denotes an overlap area on the screen after the keystone correction, wherein a pair of edge blend markers 980 are displayed at opposite sides of the overlap area 970. In FIG. 9D, although an edge blend marker at the boundary of the non-overlap area 960 and the overlap area 970 is represented by a black alternate long and short dash line, and an edge blend marker at an edge of the screen is represented by a white alternate long and short dash line, they may be represented by intelligible or simple colors.

Here, when the user carries out an operation for finishing the setting, the setting will be finished, but the installation setting of the second projector is carried out, with the edge blend marker 980 being kept displayed.

Figure 10:
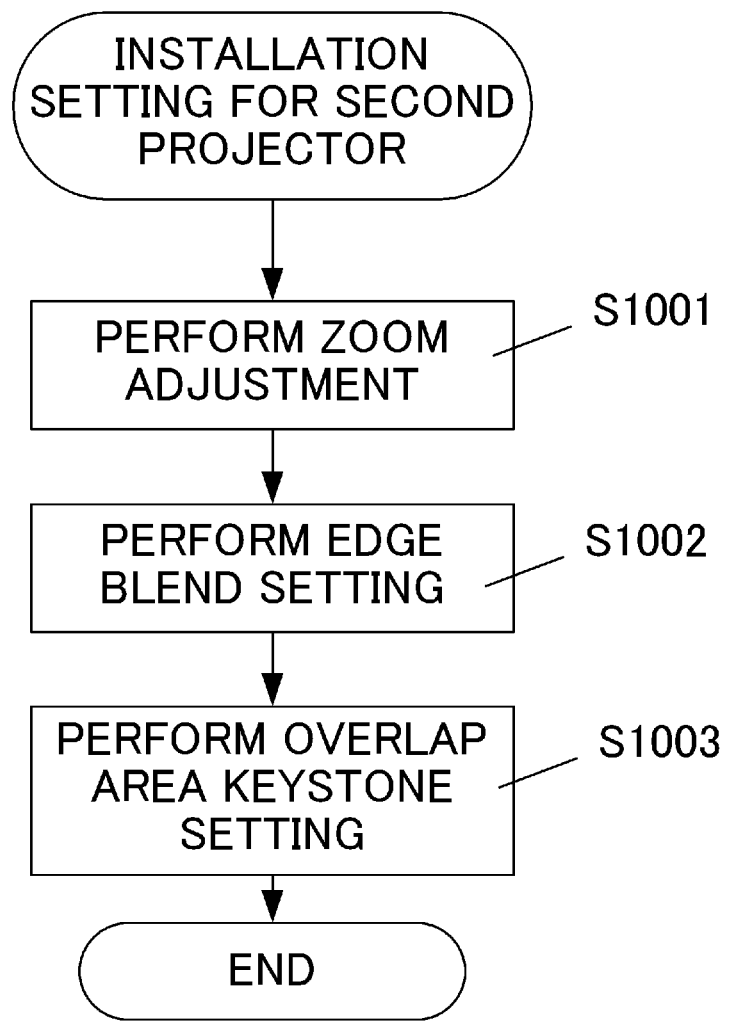
FIG. 10 is a flowchart showing installation processing for second and following projectors according to the first embodiment of the present invention.

A flow chart of processing for the installation setting of the secondary projector (subordinate projector) in step S603 is shown in FIG. 10.

First, the CPU 110 instructs the OSD superimposing unit 320 to display the zoom adjustment menu as shown in FIG. 7B, so that the user can carry out a zoom adjustment (step S1001).

Figure 11A:
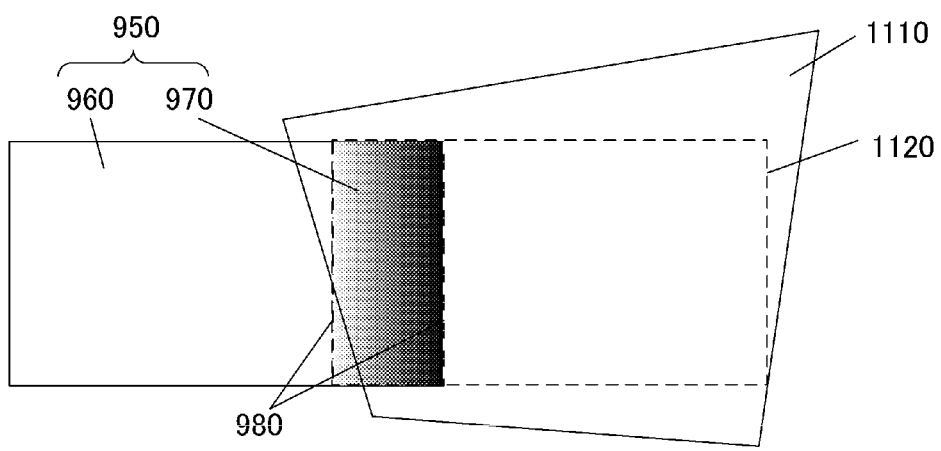
FIGS. 11A through 11F are views showing a change of a projection image by the second and following projector installation processing according to the first embodiment of the present invention.
Figure 11B:
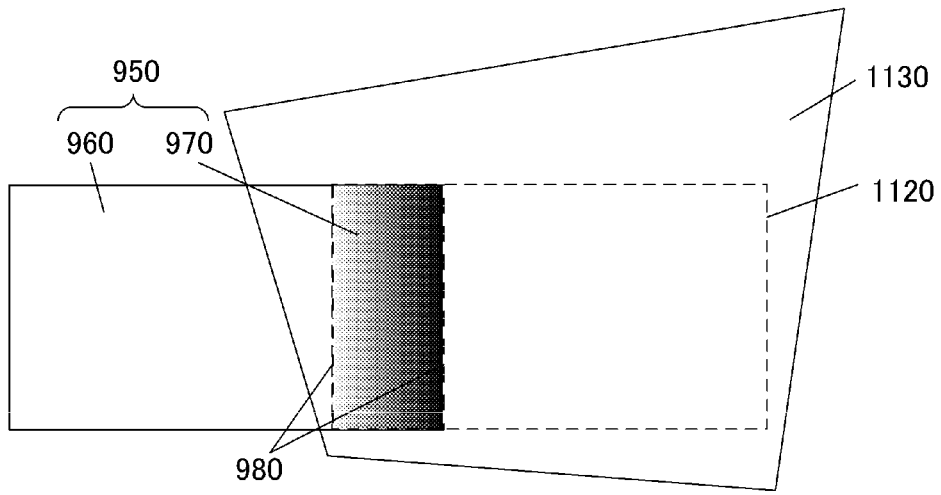

FIG. 11A through 11F are views each showing projection areas on the screen according to the first projector and the second projector. In FIG. 11A, reference numerals 950 through 980 denote the same as those of the identical symbols in FIG. 9D, and are the projection image of the first projector 420a. Reference numeral 1110 denotes a projection image before correction of the second projector 420b, and reference numeral 1120 denotes a desired projection area in the form of a target. The user carries out a zoom adjustment by adjusting an amount of zoom by means of the operation unit 113 or the unillustrated remote controller, so that a projection image 1130 after zoom adjustment of the second projector 420b includes the desired projection area 1120, as shown in FIG. 11B. The projector body of the second projector 420b may be moved if necessary.

Figure 11C:
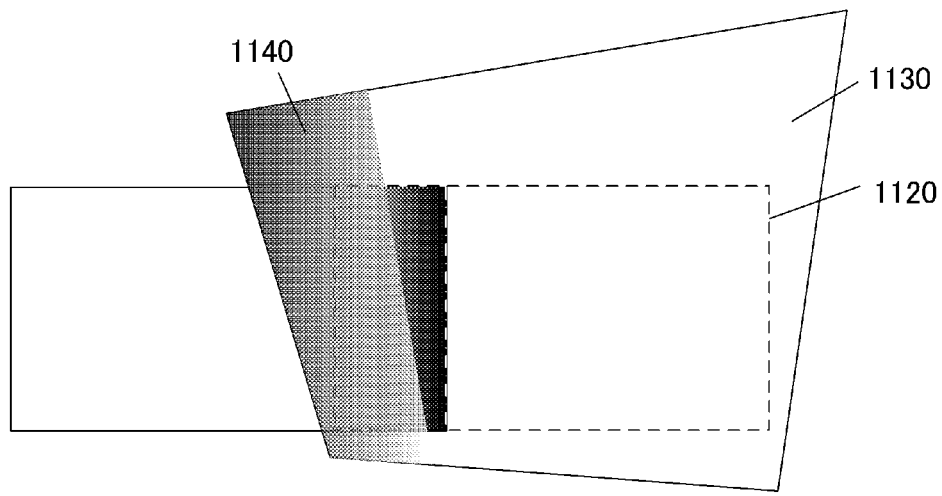

Subsequently, the CPU 110 instructs the OSD superimposing unit 320 to display an edge blend setting menu as shown in FIG. 7D, so that the user can carry out an edge blend setting (step S1002). In cases where the projector 420b in FIG. 4 is set as the second projector, edge blend at the left-hand side is herein validated, and a width of the overlap area is set. The width of the overlap area is a width of that overlap area which has been set in the image signals supplied to the projectors 420a, 420b from the image signal source 400, and is a known amount. According to this, as the projection image, an image in which the light intensity of an overlap area 1140 is reduced is projected, as shown in FIG. 11C.

Then, the CPU 110 carries out overlap area keystone setting processing (step S1003).

Figure 12:
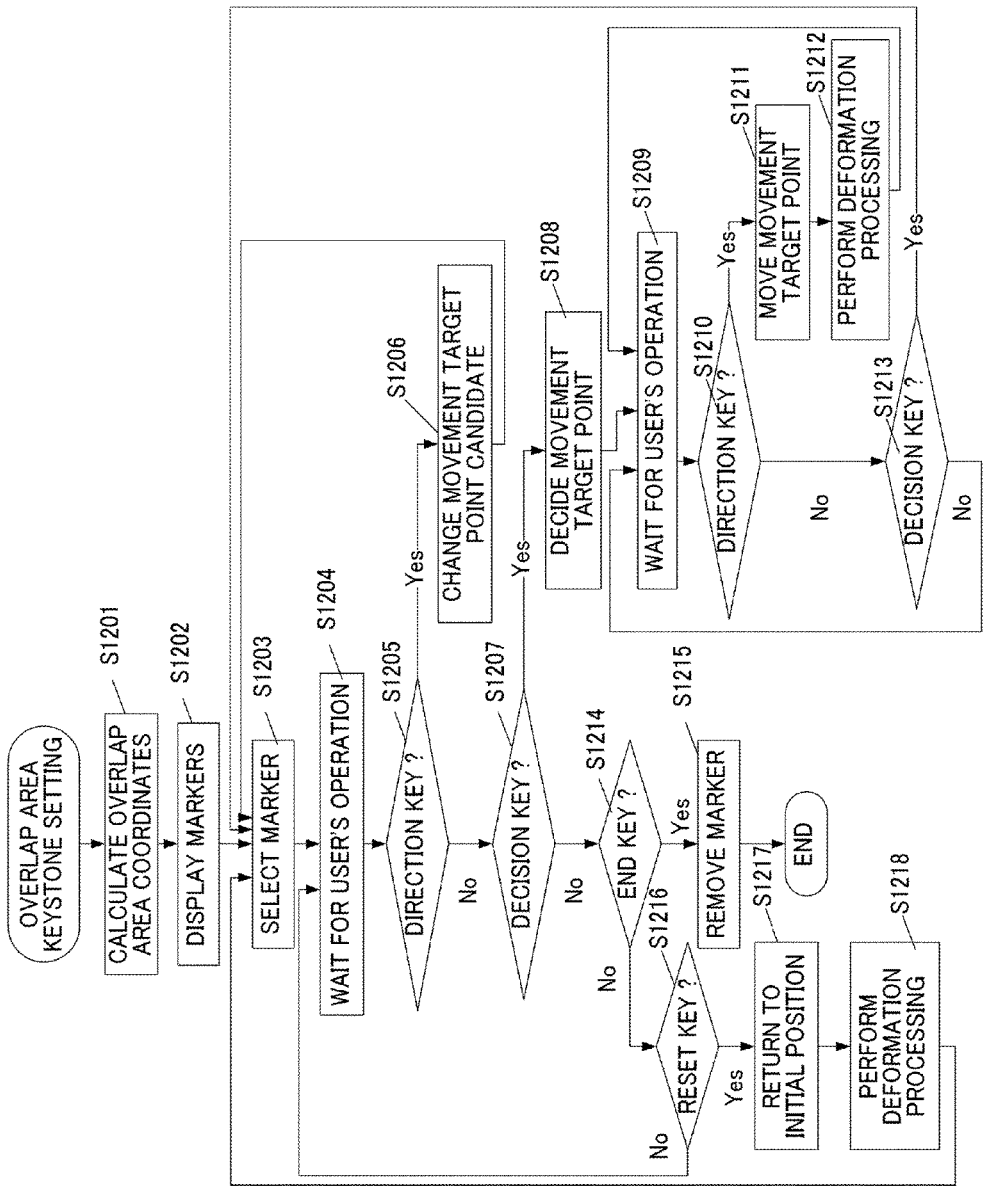
FIG. 12 is a flow chart showing overlap area deformation processing according to the first embodiment of the present invention.

A detailed flow in step S1003 is shown in FIG. 12.

First, the CPU 110 calculates the coordinates of the overlap area (step S1201). The CPU 110 calculates the coordinate values of the overlap area on the liquid crystal panel from the information on the side on which the overlap area is located and the information on the width of the overlap area, which have been set in step S1002.

Figure 11D:
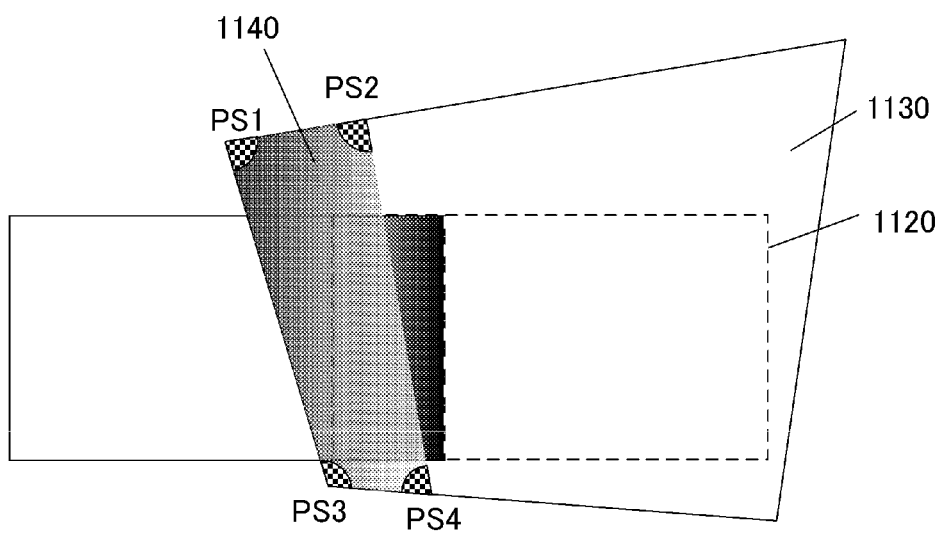

Thereafter, the CPU 110 instructs the OSD superimposing unit 320 to display deformation markers at four corners of the overlap area (step S1202). As a result of this, the deformation markers PS1 through PS4 are displayed at the four corners of the overlap area 1140, as shown in FIG. 11D. These deformation markers are points which are subjected to movement adjustment for positional alignment or registration.

Then, the CPU 110 displays one of the deformation markers PS1 through PS4 as a candidate for selection of a movement target point (step S1203).

Subsequently, the CPU 110 waits for an operation of a remote controller key, a projector body switch, or the like by the user (step S1204). Upon receipt of a user's operation, the CPU 110 determines whether an operated key (e.g., in the case of a remote controller key) is which of direction or arrow keys (up, down, left and right) (step S1205). In cases where it is a direction or arrow key (step S1205: Yes), the CPU 110 changes the movement target point candidate according to the pressed direction key (step S1206). For example, in a state where PS1 is the movement target point candidate, in cases where the right key is pressed, the movement target point candidate is changed to PS2, whereas in cases where the down key is pressed, the movement target point candidate is changed to PS3, and the display of the candidate point is also changed according to such a change. In cases where the up key or the left key is pressed in the state where PS1 is the candidate, the movement target point candidate is not changed. After that, the flow or routine returns to the step S1203.

In cases where the operated key is not any of the direction keys (step S1205: No), the CPU 110 determines whether the operated key is a decision key (step S1207). In cases where it is a direction key (step S1207: Yes), the CPU 110 decides the current movement target point candidate as a movement target point (step S1208). At this time, preferably, the CPU 110 should instruct the OSD superimposing unit 320 to display an operational guide for movement.

Then, the CPU 110 waits for a user's operation for moving the movement target point thus decided (step S1209).

Figure 11E:
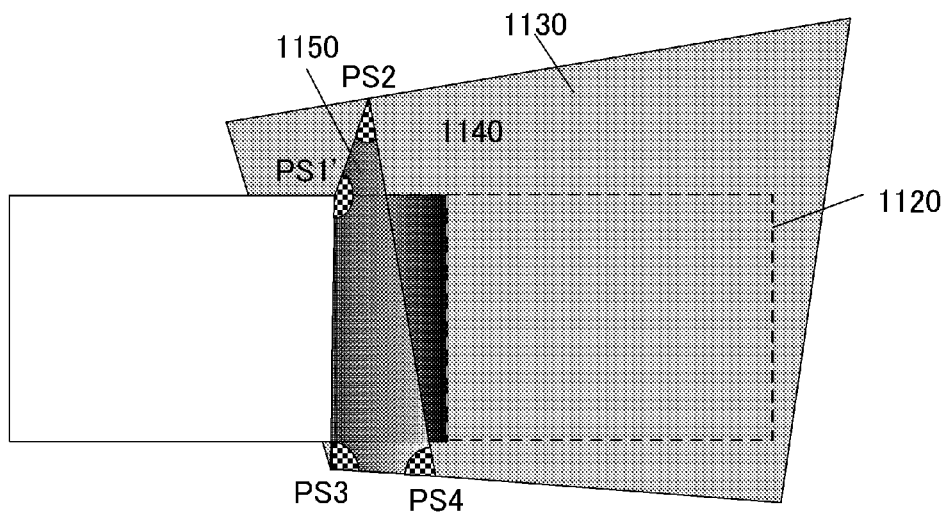

Upon receipt of a user's operation, the CPU 110 determines whether an operated key (e.g., in the case of a remote controller key) is which of direction or arrow keys (up, down, left and right) (step S1210). In cases where it is a direction or arrow key (step S1210: Yes), the CPU 110 moves the movement target point by a predetermined amount of movement according to the pressed direction key (step S1211). For example, in a state where PS1 in FIG. 11D is the movement target point, in cases where the right key is pressed, PS1 is moved to the right, whereas in cases where the down key is pressed, PS1 is moved downward. However, PS1 can not be caused to move outside the size or dimensions of the liquid crystal panel, and hence, in cases where PS1 is at a vertex of the panel, when the upper key or the left key is pressed, PS1 does not move. Each time a key is pressed, the CPU 110 carries out deformation processing by setting, as a deformed image area, a quadrangular shape with its vertices being four correction points (i.e., points at the four corners of the overlap area) including the movement target point (step S1212). Taking, as an example, a case where the deformation marker PS1 is caused to move, the user moves the marker PS1 by pressing the right key and the down key a few times so as to make it in register or coincidence with a left upper corner of the overlap area 970 of the projection image 950 of the projector 420*a*, while looking at the edge blend marker 980 which is displayed by the projector 420*a*. A state in which the movement of the deformation marker PS1 has been completed is shown in FIG. 11E. PS1' is a position of the deformation marker PS1 after the completion of the movement thereof. The CPU 110 carries out deformation processing, by obtaining a projective transformation matrix M and an offset, with which the quadrangular shape 1140, being an overlap area before correction, becomes an overlap area 1150 after deformation, and by setting them in the deformation processing unit 340. That is, the CPU 110 sets parameters for deformation processing based on the relation between the position of the overlap area before deformation and the position of the overlap area after deformation.

After that, the control process or flow returns to the step S1209.

In cases where a determination is made in step 1210 that the operated key is not any of the direction keys (step S1210: No), the CPU 110 determines whether the operated key is the decision key (step S1213). In cases where the operated key is not the decision key (step S1213: No), it is an invalid key, so the processing of the CPU 110 returns to the step S1209, where it waits for a next user's operation. On the other hand, incases where it is the decision key (step S1213: Yes), the moving processing with respect to this movement target point has been finished, so the processing of the CPU 110 returns to the step S1203, where it carries out processing for selecting the following movement target point.

In cases where a determination is made in step 1207 that the operated key is not the decision key (step S1207: No), the CPU 110 determines whether the operated key is an end key (step S1214). In cases where it is the end key (step S1214: Yes), the CPU 110 deletes the deformation marker (step S1215), and ends the overlap area keystone correction processing.

In cases where the operated key is not the end key (step S1214: No), the CPU 110 determines whether the operated key is a reset key (step S1216). In cases where the operated key is not the reset key (step S1216: No), it is an invalid key, so the processing of the CPU 110 returns to the step S1204, where it waits for a next user's operation. On the other hand, in cases where the operated key is the reset key (step S1216: Yes), the CPU 110 restores the deformation markers PS1 through PS4 to the initial positions (step S1217), carries out deformation processing (step S1218) and returns to the step S1203. The deformation processing is the same as that in step S1212.

Figure 11F:
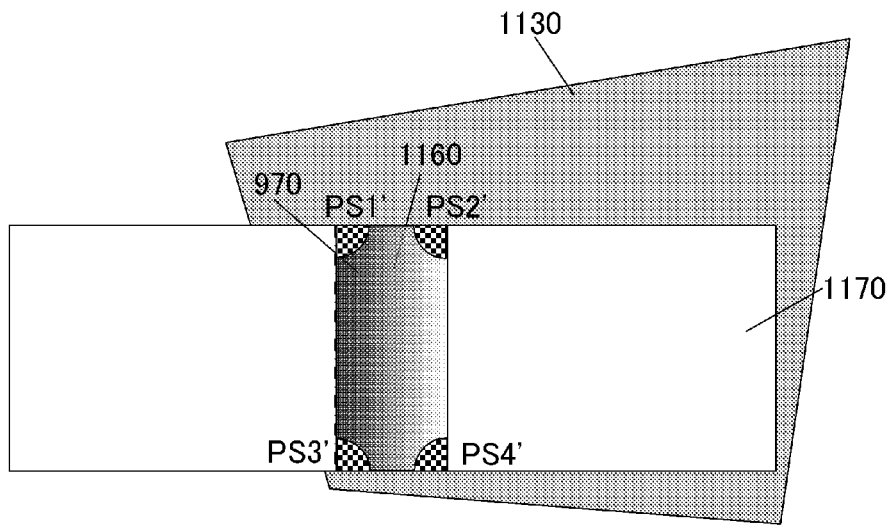

Thus, FIG. 11F shows a state in which PS1 through PS4 in the overlap area 1140 of the projection image of the projector 420*b* have been made into match or coincidence with the four corners of the overlap area 970 after keystone correction of the projection image of the projector 420*a*, respectively. Deformation markers PS1' through PS4' after movement are in coincidence with the four corners of the overlap area 970 after keystone correction of the projection image of the projector 420*a*. For that reason, an overlap area 1160 after keystone correction of the projection image of the projector 420*b* is also in coincidence with the overlap area 970 after keystone correction of the projection image of the projector 420*a*. In addition, a projection image 1170 after keystone correction of the projector 420*b* is generated in the deformation processing unit 340 by carrying out the same deformation processing as deforming the overlap area 1140 before correction of the projector 420*b* into the overlap area 1160 after correction. The projection image 1170 after correction becomes a rectangular shape of which the aspect ratio is stored automatically.

Here, the user removes the edge blend marker displays of the projector 420*a*, and ends or finishes the installation processing.

As explained above, according to this embodiment, the target positions to which the four corners of the overlap area are to be moved are made clear by the edge blend marker displays of the reference projector. Accordingly, by adjusting the individual points (i.e., the four corners of the overlap area) to the corresponding target positions, respectively, in a sequential manner, it is possible to carry out the edge blend setting which adjusts the overlap areas of two sets of projectors with each other in a strict manner. In addition, based on the keystone correction with respect to the overlap areas, keystone correction of the entire effective image area of each of the second and subsequent projectors is carried out, so that a convergence procedure to make adjustments in a repeated manner becomes unnecessary. Accordingly, the alignment of overlap areas and the setting for keystone correction in the case of carrying out multiple projections can be carried out in an easy manner.

Second Embodiment

Figure 13:
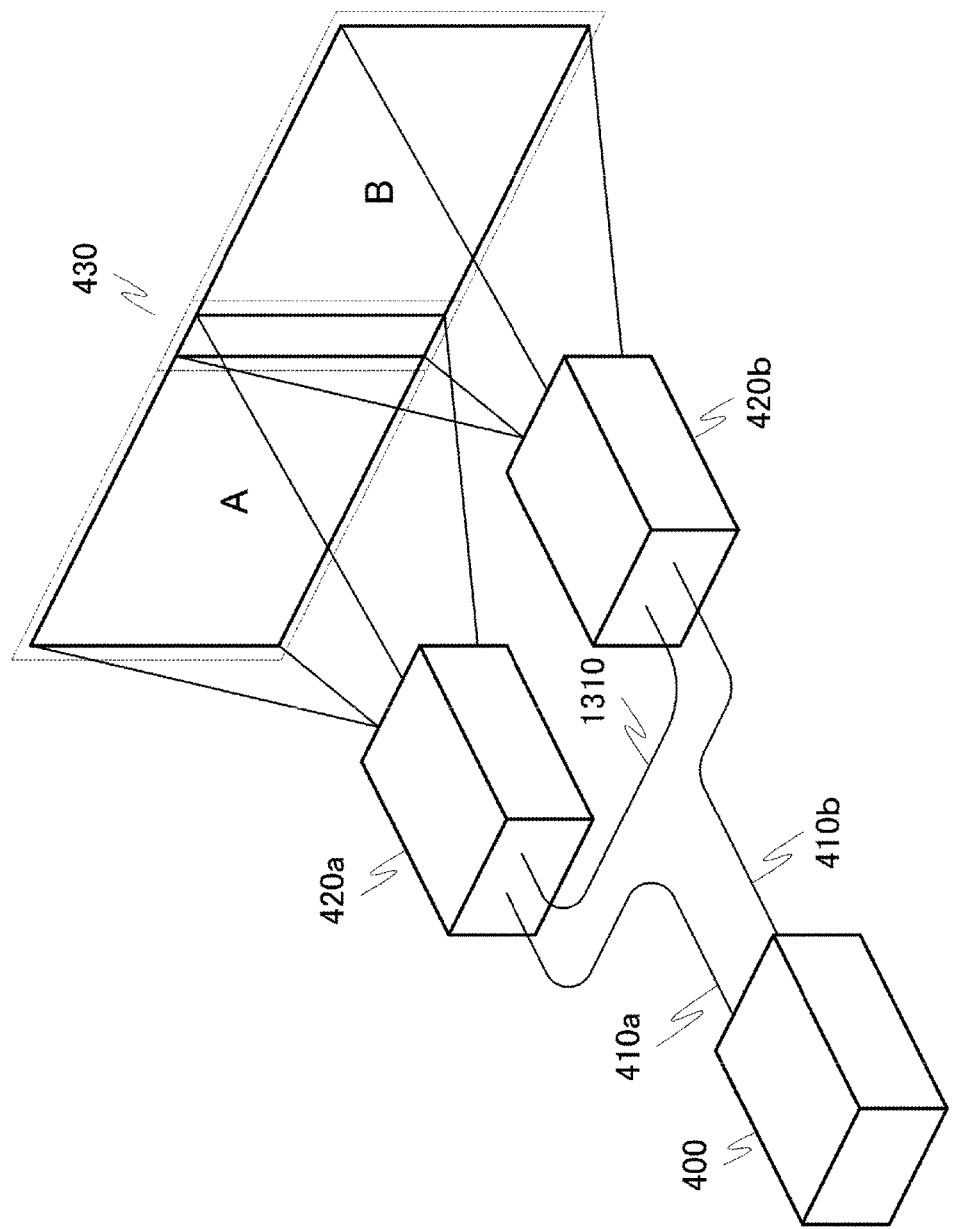
FIG. 13 is a perspective view of a multiple projection system according to a second embodiment of the present invention.

In this second embodiment, reference will be made to a liquid crystal projector, similar to the above-mentioned first embodiment. Here note that a perspective view of a multiple projection system according to this second embodiment of the present invention is shown in FIG. 13. The difference of this second embodiment from the first embodiment is that the projectors 420*a*, 420*b* are able to communicate with each other through a communication line 1310. The means of communication may be anything if transmission and reception of commands in addition to serial communication and network communication can be performed.

The overall construction of the liquid crystal projector, the basic operation thereof and the configuration of the image processing unit are the same as those in the first embodiment, and hence, the explanation thereof will be omitted.

In this second embodiment, flow charts which are executed by the CPU 110 are basically the same as those of FIG. 6, FIG. 8, FIG. 10, and FIG. 12.

In the first embodiment, the installation setting of the second or subsequent projector is actuated according to a user's instruction, but in this second embodiment, the reference projector 420*a* transmits an installation setting start command to an adjacent projector 420*b*. The timing at which the command is transmitted is at the time when in the installation setting of the reference projector 420*a*, edge blend markers have been displayed by carrying out an edge blend setting in step S803 of FIG. 8. Upon receipt of the command, the projector 420*b* starts the installation setting processing of FIG. 10, and transmits an installation setting completion notice with respect to the reference projector 420*a* at the time of the completion of the processing. Upon receipt of the installation setting completion notice, the reference projector 420*a* removes or clears the edge blend markers, and ends the installation setting.

According to this second embodiment, the projectors cooperate with each other to start an installation setting, as a result of which the adjustment procedure for multiple projection becomes still simpler.

Third Embodiment

In this third embodiment, reference will be made to a liquid crystal projector, similar to the above-mentioned first embodiment.

Here, note that the construction of a multiple projection system, the overall construction of the liquid crystal projector, the basic operation thereof and the configuration of the image processing unit are the same as those in the first embodiment, and hence, the explanation thereof will be omitted.

Figure 14A:
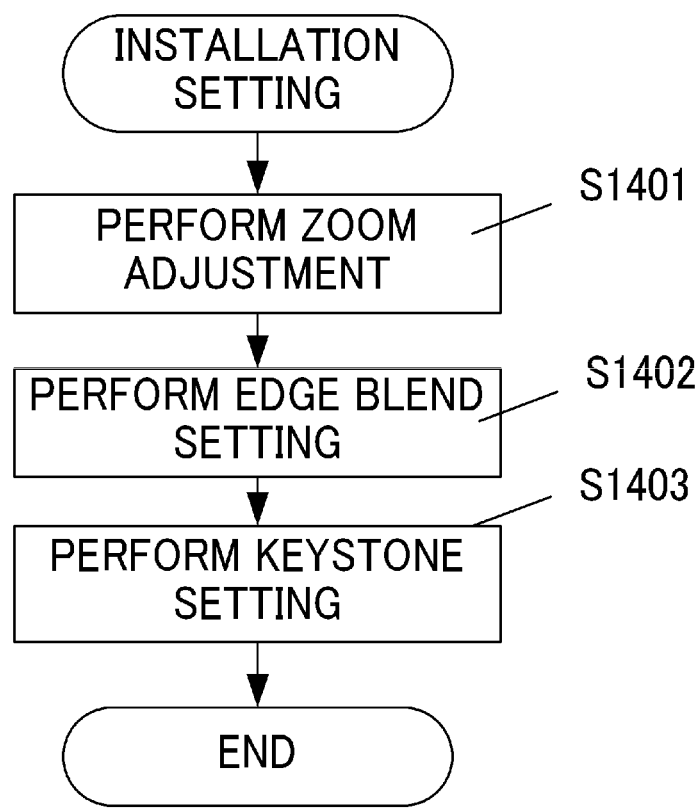
FIGS. 14A and 14B are flow charts for explaining installation processing according to a third embodiment of the present invention.
Figure 14B:
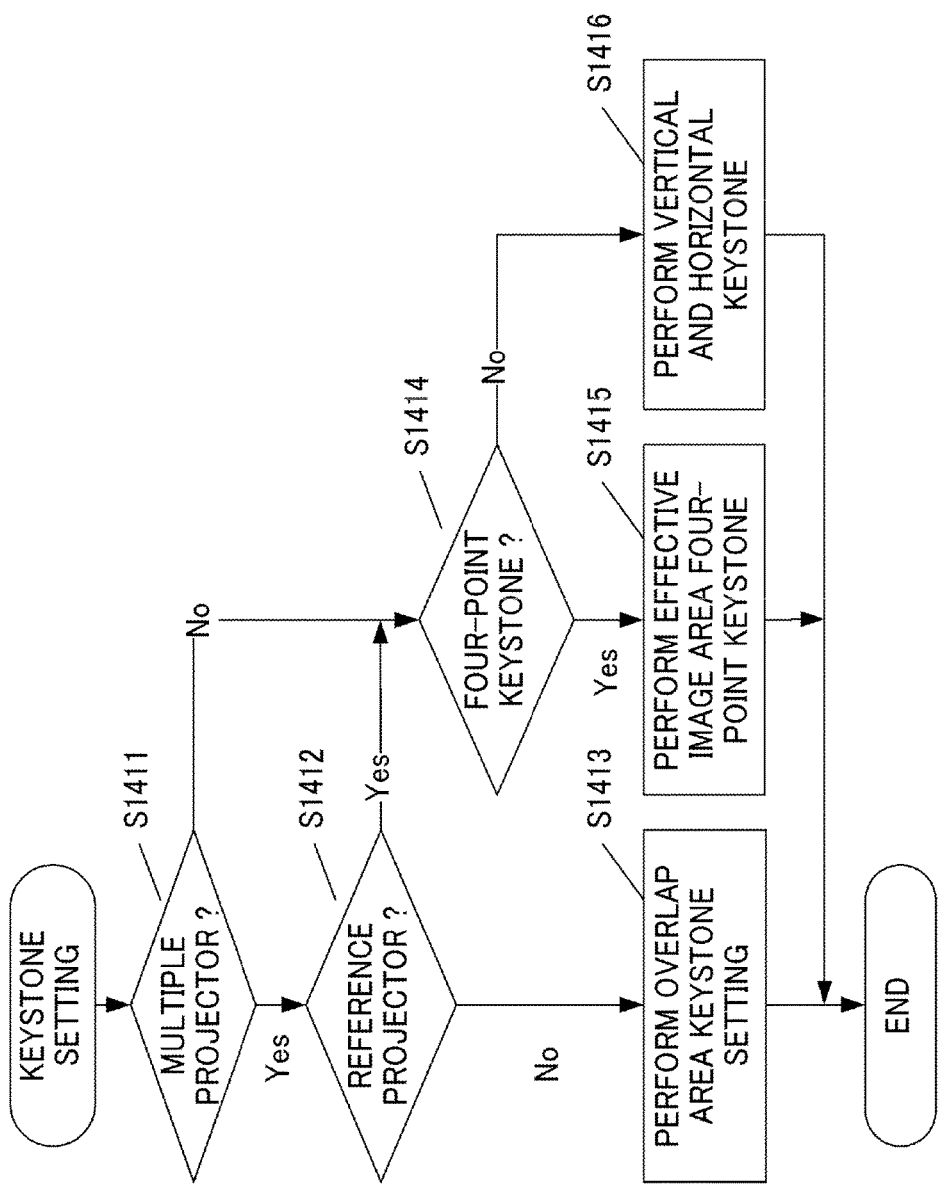

In this third embodiment, flow charts to be executed by the CPU 110 are shown in FIGS. 14A and 14B. The flowchart of FIG. 14A is activated in cases where the user starts an installation setting by means of the operation unit 113 or an unillustrated remote controller.

First, the CPU 110 instructs the OSD superimposing unit 320 to display a zoom adjustment menu as shown in FIG. 7B, so that the user can carryout a zoom adjustment (step S1401), similar to the step S801 in FIG. 8 or the step S1001 in FIG. 10.

Then, the CPU 110 instructs the OSD superimposing unit 320 to display an edge blend setting menu as shown in FIG. 7D, so that the user can carry out an edge blend setting (step S1402), similar to the step S803 in FIG. 8 or the step S1002 in FIG. 10.

Subsequently, the CPU 110 carries out keystone correction (step S1403).

A detailed flow in step S1403 is shown in FIG. 14B.

First, the CPU 110 causes the user to select whether he or she wants to perform multiple projections, by means of an unillustrated OSD display (step S1411).

In the case of multiple projection (step S1411: Yes), the CPU 110 carries out the same processing as that of step S601 in FIG. 6. That is, let the user select a first projector (reference projector) to be used as a reference for multiple projection or a secondary projector (subordinate projector) which is to be set according to the reference projector (step S1412).

In the case of the second or subsequent projector (step S1412: No), the CPU 110 carries out overlap area keystone setting processing, similar to the step S1003 in FIG. 10 (step S1413).

In cases where independent or single projection is selected in step S1411 (step S1411: No), and in cases where the reference projector is selected in step S1412 (step S1412: Yes), the CPU 110 causes the user to select a method of the keystone correction by means of the unillustrated OSD display. Here, let the user select either one of the conventional vertical and horizontal keystone correction and the four-point designation keystone correction (step S1414).

In cases where the four-point designation keystone correction is selected in step S1414 (step S1414: Yes), the CPU 110 carries out effective image area four-point keystone correction (step S1415). In this correction, deformation markers, which have been displayed at the four corners of the overlap area 1140 according to the overlap area keystone setting in step S1413, are displayed at the four corners of an effective image area, and the movement target points are also limited within the effective image area. This correction is the same as general four-point designation keystone correction. That is, in this four-point keystone correction, parameters for deformation processing are set based on the relation between the position of the projection image before deformation and the position of the projection image after deformation. Such a setting of the deformation processing according to the four-point keystone correction is referred to as a second setting mode.

In cases where the vertical and horizontal keystone correction is selected in step S1414 (step S1414: No), the CPU 110 causes the user to perform keystone adjustment, similar to the step S802 in FIG. 8 (step S1416).

In cases where any of steps S1413, S1415 and S1416 is ended, the CPU 110 ends the keystone setting processing.

In this embodiment, in the case of the second or subsequent projector for multiple projections, keystone correction in which the four corners of the overlap area are specified can be carried out. Accordingly, in addition to there being the same effects as the first embodiment, a desired method of keystone correction can be selected in the case of not multiple projection, as well as in the case of the reference projector for multiple projection, as a result of which it is possible to select an optimal setting method in accordance with a situation.

Other Embodiments

The object of the present invention can also be achieved by supplying to the device a storage medium on which recorded the program code of software which achieves the functions of the above-mentioned embodiments. At this time, a computer (or CPU and MPU) including a control unit of the device thus supplied with the storage medium reads out and executes the program code stored in the storage medium.

In this case, the program code thus read out of the storage medium itself achieves the functions of the above-mentioned embodiments, and the program code itself and the storage medium with the program code stored thereon constitute the present invention.

As the storage medium for supplying the program code, there can be used, for example, a flexible hard disk, a hard disk, an optical disk, a magneto-optical disc, a CD-ROM, a CD-R, a magnetic tape, a nonvolatile memory card, a ROM, and so on.

Moreover, the present invention also includes a case in which an OS (a basic system or an operating system), etc., which operates on the device, carries out part or all of processing based on instructions of the above-mentioned program cord, so that the functions of the above-mentioned embodiments are achieved by that processing.

Further, the present invention also includes a case in which a program code read out of a storage medium is written into a memory provided in a function expansion board which has been inserted into the device, or a memory provided in a function expansion unit which has been connected to a computer, whereby the functions of the above-mentioned embodiments are achieved. At this time, a CPU, etc., which is provided in the function expansion board or the function expansion unit, carries out part or all of actual processing based on instructions of the program code.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225969, filed on Oct. 11, 2012, which is hereby incorporated by reference herein in its entirety.

What is claimed is:

1. A projector which constitutes an image projection system to project one image by combining a plurality of projection images projected by a plurality of projectors on a screen while overlapping parts of the projection images with each other, said projector comprising:
a deformation unit configured to carry out geometric deformation with respect to an image to be projected therefrom;
a setting unit configured to set a parameter for deformation processing by said deformation unit; and
a receiving unit configured to receive, while recognizably projecting four corners of an overlap area in a projection image by the projector, user's operations to input instructions to select one of said four corners and to move the position of the selected corner, wherein the overlap area in the projection image is predetermined as an area to be overlapped with a part of an adjacent projection image projected by another projector,
wherein said setting unit sets as said parameter for deformation processing a parameter for deforming an entire projection image to be projected by the projector based on coordinates of said four corners after movement of the selected corner, and
said deformation unit carries out a deformation based on the set parameter.

2. The projector as set forth in claim 1, further comprising:
a display unit configured to display a marker at the position of each of the four corners of the overlap area in the projection image,
wherein said receiving unit receives a user's operation which inputs an instruction to select and move a position of said marker.

3. The projector as set forth in claim 1, wherein the receiving unit receives user's operation of a remote controller key or a projector body key.

4. The projector as set forth in claim 1, further comprising a width setting unit configured to allow a user to set an overlap width,
wherein the projector projects the four corners of the overlap area in the projection image based on the set overlap width.

5. The projector as set forth in claim 1, wherein each time an instruction to move the position of the selected corner is received by the receiving unit, the setting unit updates the parameter for deformation processing and the deformation unit carries out the deformation based on the updated parameter.

6. The projector as set forth in claim 1, wherein the receiving unit is able to selectively perform either any one of modes including a first mode and a second mode,
in the first mode, the receiving unit receives, while recognizably projecting the four corners of the overlap area in the projection image by the projector, user's operations to input instructions to select one of the four corners of the overlap area and to move a position of the selected corner of the overlap area,
in the second mode, the receiving unit receives, while recognizably projecting four corners of the projection image by the projector, user's operations to input instructions to select one of the four corners of the projection image and to move a position of the selected corner of the projection image.

7. The projector as set forth in claim 1, projecting the four corners of the overlap area in the projection image on the screen, on which a rectangle area in the adjacent projection image is projected as an area to be overlapped with the overlap area in the projection image.

8. A control method for a projector which constitutes an image projection system to project one image by combining a plurality of projection images projected by a plurality of projectors on a screen while overlapping parts of the projection images with each other, said method comprising:
carrying out geometric deformation processing with respect to an image to be projected;
setting a parameter for said deformation processing; and
receiving, while recognizably projecting four corners of an overlap area in a projection image by the projector, user's operations to input instructions to select one of said four corners and to move the position of the selected corner, wherein the overlap area in the projection image is predetermined as an area to be overlapped with a part of an adjacent projection image projected by another projector,
wherein in said setting, as said parameter for deformation processing a parameter for deforming an entire projection image to be projected by the projector based on coordinates of said four corners after movement of the selected corner, and
a deformation is carried out based on the set parameter.

9. The control method for a projector as set forth in claim 8, further comprising:
displaying a marker at the position of each of the four corners of the overlap area in the projection image,
wherein a user's operation which inputs an instruction to select and move a position of said marker is received.

10. The control method for a projector as set forth in claim 8, wherein receiving comprises receiving user's operation of a remote controller key or a projector body key.

11. The control method for a projector as set forth in claim 8, further comprising setting an overlap width based on a user instruction,
wherein the projector projects the four corners of the overlap area in the projection image based on the set overlap width.

12. The control method for a projector as set forth in claim 8, further comprising, each time an instruction to move the position of the selected corner is received, updating the parameter for deformation processing and carrying out the deformation based on the updated parameter.

13. The control method for a projector as set forth in claim 8, the receiving step further comprising selectively performing either any one of modes including a first mode and a second mode, in the first mode, receiving, while recognizably projecting the four corners of the overlap area in the projection image by the projector, user's operations to input instructions to select one of the four corners of the overlap area and to move a position of the selected corner of the overlap area, in the second mode, receiving, while recognizably projecting four corners of the projection image by the projector, user's operations to input instructions to select one of the four corners of the projection image and to move a position of the selected corner of the projection image.

14. The control method for a projector as set forth in claim 8, further comprising projecting the four corners of the overlap area in the projection image on the screen, on which a rectangle area in the adjacent projection image is projected as an area to be overlapped with the overlap area in the projection image.

15. An image projection system which projects one image by combining a plurality of projection images projected by a plurality of projectors on a screen while overlapping parts of the projection images with each other, wherein said plurality of projectors include a reference projector which projects a first projection image as a reference, and a secondary projector of which a position of a second projection image to be projected therefrom is adjusted according to the first projection image;

wherein said reference projector comprises:

a first deformation unit configured to carry out geometric deformation with respect to the first projection image to be projected therefrom; and a first setting unit configured to set a first parameter for deformation processing by said first deformation unit;

wherein said first setting unit sets said first parameter for deformation processing by selecting either one of a first setting mode in which said first parameter for deformation processing is set based on a relative tilt angle between said reference projector and the screen, and a second setting mode in which said first parameter for deformation processing is set based on a relation between a position of the first projection image before the deformation by said first deformation unit is carried out, and a position of the first projection image after the deformation by said first deformation unit has been carried out;

wherein said secondary projector comprises:

a second deformation unit configured to carry out geometric deformation with respect to the second projection image to be projected therefrom;

a second setting unit configured to set a second parameter for deformation processing by said second deformation unit; and a receiving unit configured to receive, while recognizably projecting four corners of an overlap area in the second projection image by the secondary projector, user's operations to input instructions to select one of said four corners and to move the position of the selected corner, wherein the overlap area in the second projection image is predetermined as an area to be overlapped with a part of the first projection image projected by the reference projector, wherein said second setting unit sets as said second parameter for deformation processing a parameter for deforming an entire second projection image to be projected by the secondary projector based on coordinates of said four corners after movement of the selected corner, and said second deformation unit carries out a deformation based on the set second parameter.

16. The image projection system as set forth in claim 15, wherein said first setting unit of said reference projector sets, in said second setting mode, said first parameter for deformation processing based on a relation between coordinates of four corners of the first projection image before the deformation by said first deformation unit is carried out, and coordinates of four corners of the first projection image after the deformation by said first deformation unit has been carried out.

17. The image projection system as set forth in claim 15, wherein said reference projector is provided with a first input unit to receive a user's operation which inputs the relative tilt angle between said reference projector and the screen; and wherein said first setting unit of said reference projector sets, in said first setting mode, said first parameter for deformation processing based on information of the relative tilt angle inputted by the user's operation.

18. The image projection system as set forth in claim 15, wherein said secondary projector comprises:

a display unit configured to display a marker at the position of each of the four corners of the overlap area in the second projection image, wherein said receiving unit receives a user's operation which inputs an instruction to select and move a position of said marker.

19. The image projection system as set forth in claim 18, wherein when the user's operation to move the position of said marker is carried out in said secondary projector, said reference projector at least performs projection of a first overlap area in the first projection image in such a manner that a user can move the position of said marker to a position of a corresponding corner of the first overlap area in the first projection image.

20. The image projection system as set forth in claim 15, wherein said reference projector is provided with a communication unit configured to notify said secondary projector of the fact that setting of the first parameter by means of said first setting unit has been completed.

21. The image projection system as set forth in claim 15, wherein said secondary projector further comprises a width setting unit configured to allow a user to set an overlap width, wherein the secondary projector projects the four corners of the overlap area in the second projection image based on the set overlap width.

22. The image projection system as set forth in claim 15, wherein each time an instruction to move the position of the selected corner is received by the receiving unit, the second setting unit updates the second parameter for deformation processing and the second deformation unit carries out the deformation based on the updated second parameter.

* * * * *